US008665578B2

(12) United States Patent
Pelrine et al.

(10) Patent No.: US 8,665,578 B2
(45) Date of Patent: Mar. 4, 2014

(54) ELECTROADHESIVE DEVICES

(75) Inventors: Ronald E. Pelrine, Longmont, CO (US); Harsha Prahlad, Cupertino, CA (US); Joseph S. Eckerle, Woodside, CA (US); Roy D. Kornbluh, Palo Alto, CA (US); Scott E. Stanford, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 13/354,293

(22) Filed: Jan. 19, 2012

(65) Prior Publication Data

US 2012/0120544 A1 May 17, 2012

Related U.S. Application Data

(63) Continuation of application No. 12/830,239, filed on Jul. 2, 2010, now Pat. No. 8,125,758, which is a continuation of application No. 11/830,814, filed on Jul. 30, 2007, now Pat. No. 7,773,363, which is a continuation of application No. 11/757,922, filed on Jun. 4, 2007, now Pat. No. 7,551,419.

(60) Provisional application No. 60/803,953, filed on Jun. 5, 2006, provisional application No. 60/866,555, filed on Nov. 20, 2006.

(51) Int. Cl.
*H01L 21/683* (2006.01)

(52) U.S. Cl.
USPC .......................................................... 361/234

(58) Field of Classification Search
USPC .......................................................... 361/234
See application file for complete search history.

(56) References Cited

U.S. PATENT DOCUMENTS

| 2,975,307 A | 3/1961 | Schroeder et al. |
| 3,634,740 A | 1/1972 | Stevko |
| 3,916,270 A | 10/1975 | Wachtler et al. |
| 4,257,083 A | 3/1981 | Blyth |

(Continued)

FOREIGN PATENT DOCUMENTS

| GB | 2346960 | 2/1999 |
| JP | 05-253175 | 10/1993 |

(Continued)

OTHER PUBLICATIONS

Office Action dated Jan. 31, 2012 from Japanese Application No. 2007-502971.

(Continued)

*Primary Examiner* — Scott Bauer
(74) *Attorney, Agent, or Firm* — McDonnell Boehnen Hulbert & Berghoff LLP

(57) ABSTRACT

Described herein is electroadhesion technology that permits controllable adherence between two objects. Electroadhesion uses electrostatic forces of attraction produced by an electrostatic adhesion voltage, which is applied using electrodes in an electroadhesive device. The electrostatic adhesion voltage produces an electric field and electrostatic adherence forces. When the electroadhesive device and electrodes are positioned near a surface of an object such as a vertical wall, the electrostatic adherence forces hold the electroadhesive device in position relative to the surface and object. This can be used to increase traction or maintain the position of the electroadhesive device relative to a surface. Electric control of the electrostatic adhesion voltage permits the adhesion to be controllably and readily turned on and off.

20 Claims, 18 Drawing Sheets

(56) References Cited

U.S. PATENT DOCUMENTS

| | | | |
|---|---|---|---|
| 4,861,665 | A | 8/1989 | Kasahara |
| 5,206,557 | A | 4/1993 | Bobbio |
| 5,290,400 | A | 3/1994 | Bobbio |
| 5,497,861 | A | 3/1996 | Brotz et al. |
| 5,563,466 | A | 10/1996 | Rennex et al. |
| 5,638,249 | A | 6/1997 | Rubino et al. |
| 5,662,294 | A | 9/1997 | Maclean et al. |
| 5,682,075 | A | 10/1997 | Bolleman et al. |
| 5,745,331 | A | 4/1998 | Shamouilian et al. |
| 6,141,571 | A | 10/2000 | Dionne |
| 6,156,842 | A | 12/2000 | Hoenig et al. |
| 6,184,608 | B1 | 2/2001 | Cabuz et al. |
| 6,198,204 | B1 | 3/2001 | Pottenger |
| 6,376,971 | B1 | 4/2002 | Pelrine et al. |
| 6,388,043 | B1 | 5/2002 | Langer et al. |
| 6,420,814 | B1 | 7/2002 | Bobbio |
| 6,485,273 | B1 | 11/2002 | Goodwin-Johansson |
| 6,514,895 | B1 | 2/2003 | Chiu et al. |
| 6,519,074 | B2 | 2/2003 | Little et al. |
| 6,646,364 | B1 | 11/2003 | Horning et al. |
| 6,683,516 | B2 | 1/2004 | Chiu et al. |
| 6,684,469 | B2 | 2/2004 | Horning et al. |
| 6,693,790 | B2 | 2/2004 | Matsuki et al. |
| 6,709,739 | B1 | 3/2004 | Mullen et al. |
| 6,760,214 | B2 | 7/2004 | Tomaru et al. |
| 6,774,077 | B2 | 8/2004 | Sengupta et al. |
| 6,781,284 | B1 | 8/2004 | Pelrine et al. |
| 6,781,812 | B2 | 8/2004 | Fuwa et al. |
| 6,791,817 | B2 | 9/2004 | Allison et al. |
| 6,793,937 | B2 | 9/2004 | Quong |
| 6,795,296 | B1 | 9/2004 | Palanduz et al. |
| 6,811,883 | B2 * | 11/2004 | Lewiner et al. ............... 428/421 |
| 6,812,624 | B1 | 11/2004 | Pei et al. |
| 6,813,064 | B2 | 11/2004 | John et al. |
| 6,876,279 | B2 | 4/2005 | Sengupta et al. |
| 6,882,086 | B2 | 4/2005 | Kornbluh et al. |
| 6,905,989 | B2 | 6/2005 | Ellis et al. |
| 6,907,294 | B2 | 6/2005 | Andino et al. |
| 7,053,737 | B2 | 5/2006 | Schwartz et al. |
| 7,105,758 | B2 | 9/2006 | Nakanishi et al. |
| 7,196,599 | B2 | 3/2007 | Dabbaj |
| 7,256,670 | B2 | 8/2007 | Jahnes et al. |
| 7,372,690 | B2 | 5/2008 | Moffatt |
| 2002/0082668 | A1 | 6/2002 | Ingman |
| 2002/0166212 | A1 | 11/2002 | Pratl |
| 2002/0191267 | A1 | 12/2002 | Flanders et al. |
| 2003/0184731 | A1 | 10/2003 | Allison et al. |
| 2004/0056742 | A1 | 3/2004 | Dabbaj |
| 2005/0235537 | A1 | 10/2005 | Robert Lee et al. |
| 2006/0186700 | A1 | 8/2006 | Browne et al. |
| 2006/0192465 | A1 | 8/2006 | Kornbluh et al. |
| 2007/0024403 | A1 | 2/2007 | Kwon et al. |
| 2007/0285870 | A1 | 12/2007 | Shim |
| 2008/0075930 | A1 | 3/2008 | Kornbluh et al. |
| 2010/0007240 | A1 | 1/2010 | Kornbluh et al. |
| 2010/0249553 | A1 | 9/2010 | MacLaughlin |

FOREIGN PATENT DOCUMENTS

| | | |
|---|---|---|
| JP | 6-341489 | 12/1994 |
| JP | 5-344753 | 12/1996 |
| JP | 2003-506858 | 2/2003 |
| WO | 7900510 | 8/1979 |
| WO | 9420984 | 9/1994 |

OTHER PUBLICATIONS

Office Action dated Aug. 8, 2011 from Chinese Application No. 200580014841.7.
Notice of Allowance dated Jan. 17, 2012 from U.S. Appl. No. 12/830,239.
Notice of Allowance dated Nov. 28, 2011 from U.S. Appl. No. 12/964,614.
Final Office Action dated Aug. 23, 2011 from U.S. Appl. No. 12/830,239.
Office Action dated Jun. 10, 2011 from U.S. Appl. No. 12/964,614.
Final Office Action dated Apr. 21, 2011 from U.S. Appl. No. 12/550,222.
Office Action dated Apr. 4, 2011 from U.S. Appl. No. 12/830,239.
Office Action dated Feb. 1, 2011 from Japanese Application No. 2007-502971.
Office Action dated Dec. 2, 2010 from Chinese Application No. 200580014841.7.
Office Action dated Nov. 5, 2010 from U.S. Appl. No. 12/550,222.
Notice of Allowance dated Sep. 20, 2010 in U.S. Appl. No. 12/467,080.
Office Action dated Jun. 23, 2010 for U.S. Appl. No. 12/467,080.
Office Action dated Nov. 27, 2009 in Chinese Application No. 200580014841.7.
Office Action dated May 13, 2009 in U.S. Appl. No. 11/830,806.
Office Action dated May 11, 2009 in U.S. Appl. No. 11/078,678.
Notice of Allowance dated Apr. 24, 2009 in U.S. Appl. No. 11/757,922.
Notice of Allowance dated Apr. 3, 2009 in U.S. Appl. No. 11/757,913.
Supplemental Notice of Allowance dated May 15, 2009 in U.S. Appl. No. 11/757,913.
Yamamoto et al., "Wall Climbing Mechanisms Using Electrostatic Attraction Generated by Flexible Electrodes," Micro-NanoMechatronics and Human Science, 2007. MHS '07. International Symposium on <http://ieeexplore.ieee.org/xpl/RecentCon.jsp?punumber=4420810> Nov. 11-14, 2007 pp:389-394 Digital Object Identifier 10.1109/MHS.2007.4420886.
Presentation to DARPA DSO officials on May 26, 2006 entitled "Electroadhesive Wall-Climbing Robot for Three-Dimensional Mobility in Urban Environments."
Office Action dated Dec. 3, 2008 in U.S. Appl. No. 11/078,678.
Office Action dated Dec. 3, 2008 in U.S. Appl. No. 11/830,806.
Office Action dated Aug. 7, 2008 in U.S. Appl. No. 11/757,913.
International Search Report dated Jul. 30, 2008 in PCT Application No. PCT/US07/70432.
Written Opinion dated Jul. 30, 2008 in PCT Application No. PCT/US07/70432.
International Search Report dated Aug. 15, 2008 in PCT Application No. PCT/US07/70437.
Written Opinion dated Aug. 15, 2008 in PCT Application No. PCT/US07/70437.
Office Action dated Apr. 29, 2008 in U.S. Appl. No. 11/078,678.
Office Action dated Apr. 17, 2007 in U.S. Appl. No. 11/078,678.
Office Action dated Nov. 6, 2007 in U.S. Appl. No. 11/078,678.
Andeen et al., 1988. "Design of Compliance in Robotics," *Proc. IEEE Conference on Robotics and Automation*, Philadelphia, Pennsylvania, pp. 276-281.
Ashley, S., "Smart Skis and Other Adaptive Structures", *Mechanical Engineering*, Nov. 1995, pp. 77-81.
Bakshaev, G.I., "RK, LIG-7" on Feb. 1, 2005. from http://www.ctrl-c.liu.se/misc/ram/rk.html on Feb. 1, 2005.
Bar-Cohen, Y., (ed.), Electroactive Polymer (EAP) Actuators as Artificial Muscles-Reality, Potential and Challenges, SPIE Press, Bellingham, Washington, 2001.
Baughman et al., "Conducting polymer electromechanical actuators," *Conjugated Polymeric Materials: Opportunities in Electronics, Optoelectronics and Molecular Electronics*, eds. J. Bredas and R. Chance, Kluwer Academic Publishers, The Netherlands, pp. 559-582, 1990.
Bergamini et al., "Electrostatic Tuning of the Bending Stiffness of Simple, Slender Multi-layer Composite Structures," SPIE Annual International Symposium on Smart Structures and Materials 2005, San Diego, Mar. 7, 2005, vol. 5760, pp. 152-162.
Blaya, "Force Controllable Ankle-Foot Orthosis (AFO) to Assist Drop Foot Gait," Dept. of Mechanical Engineering Masters Thesis, Cambridge, MA: Massachusetts Institute of Technology, 2002.
Bobbio et al., "Integrated force arrays," *Proc. IEEE Micro Electro Mechanical Systems Workshop*, Fort Lauderdale, Florida, 1993.
Carpenter et al., "Entanglement Networks of 1,2-Polybutadiene Cross-Linked in States of Strain. V. Relaxation Phenomena and Calculations of Entanglement Trapping," Polymer Engineering and Science, vol. 19, No. 4, Mar. 1979.

(56) References Cited

OTHER PUBLICATIONS

Carpenter et al., "Entanglement Networks of 1,2-Polybutadiene Crosslinked in States of Strain. IX. Swelling and Anisotropy," Journal of Polymer Science: Polymer Physics Edition, vol. 18, 615-167 (1980).

Carpenter et al., "Entanglement Networks of 1,2-Polybutadiene CrossLinked in States of Strain. IX. States of Ease and Stress-Strain Behavior," Journal of Applied Polymer Science, vol. 22, pp. 335-342 (1978).

Carpenter et al., "Entanglement Networks of 1,2-Polybutadiene Cross-Linked in States of Strain. 3. Effect of Temperature," Macromolecules, vol. 10, No. 1, Jan.-Feb. 1977.

Carpenter et al., "Equilibrium and Transient Studies of Mechanical Properties of 1,2-Polybutadiene Cross-Linked in Simple Extension," Journal of Rheology, Abstracts of the $48_{th}$ Meeting, vol. 23, 1979.

Dunne et al., "Ground Demonstration of the Smart Inlet," AIAA 2000-1630, in $41_{st}$ Structures, Structural Dynamics, and Materials Conference and Exhibit Adaptive Structures Forum, Atlanta, GA (April).

Ferry et al., "Interpretation of Deviations From Neo-Hookean Elasticity by a Two-Network Model with Crosslinks and Trapped Entanglements," Rubber Chemistry and Technology, vol. 51, 730-737, Mar. 1978.

Ferry, John D., "Applications of a two-network model for crosslinks and trapped entanglements," Polymer, 1979, vol. 20, November.

Ginder et al. "Controllable-stiffness components based on magnetorheological elastomers," *Smart Structures and Materials 2000: Smart Structures and Integrated Systems*, Proc. SPIE vol. 3985, pp. 418-425 (2000).

Goldfarb, "Control for a Self-Contained Microcomputer-Controlled Above-Knee Prosthesis," *Department of Mechanical Engineering Masters Thesis*, Cambridge, MA: Massachusetts Institute of Technology, 1992.

Granick et al., "Entangled Chain Structure Trapped in a Styrene-Butadiene Random Copolymer by Cross-Linking in Simple Extension," Macromolecules 1983, 16, 39-45.

Hawkins et al., "Machine Augmented Composites", in *Smart Structures and Materials 2002: Industrial and Commercial Applications of Smart Structures Technologies*, ed. A.R. McGowen, Proc. SPIE, vol. 4698, pp. 231-236 (2002).

Herr, H., "Presentation highlights: Prosthetic and orthotic limbs", Journal of Rehabilitation Research and Development, vol. 39, No. 3 (Supplement), May/Jun. 2002, VA/NIH Prosthetics Roundtable, pp. 11-12 (2002).

Hodgson et al., "Shape Memory Alloys", From Metals Handbook, vol. 2, Tenth Edition.

Hunter et al., "A comparison of muscle with artificial actuators," *Tech. Digest of IEEE Solid-State Sensor and Actuator Workshop*, Hilton Head, South Carolina, pp. 178-185, 1992.

Hunter et al., "Fast reversible NiTi fibers for use in microrobotics," *Proc. 1991 IEEE Micro Electro Mechanical Systems-Mems '91*, Nara, Japan, pp. 166-170, 1991.

Hvidt et al., "Contribution of Entanglements to the Equilibrium Modulus of 1,2-Polybutadiene Networks at Small Strains and Estimate of the Front Factor," Macromolecules 1980, 933-939.

Kan et al., "Entanglement Networks of 1,2-Polybutadiene Crosslinked in States of Strain.VII. Stress-Birefringence Relations," Journal of Polymer Science: Polymer Physics Edition, vol. 17, 1855-1869 (1979).

Kan et al., "Entanglement Networks of 1,2-Polybutadiene Crosslinked in States of Strain, 8. Trapping of Entanglements in Relaxed and Unrelaxed Configurations," Macromolecules, vol. 12, No. 3, 494-498, May-Jun. 1979.

Kan et al., "Stress-Birefringence Relations in Networks of 1,2-Polybutadiene Cross-Linked in Uniaxial Extension," Journal of Rheology, vol. 23, Issue 3, Jun. 1979.

Kan et al., "Trapped Entanglements vs. Dissociable Junctions in Networks Cross-Linked in Strained States," Macromolecules 1980, 13, 1313-1314.

Kornbluh et al., "Application of Dielectric EAP Actuators," Electroactive Polymer (EAP) Actuators as Artificial Muscles-Reality, Potential and Challenges, ed. Y. Bar-Cohen, SPIE Press, Bellingham, Washington, pp. 457-495, 2001.

Kornbluh et al., "Electroelastomers: applications of dielectric elastomer transducers for actuation, generation and smart structures," *Smart Structures and Materials 2002: Industrial and Commercial Applications of Smart Structures Technologies*, ed. A. McGowan, Proc. SPIE 4698, pp. 254-270, 2002.

Kornbluh et al., "Rubber to rigid, clamped to undamped: Toward composite materials with wide-range controllable stiffness and damping," SPIE Smart Structures and Materials 2004: Industrial and Commercial Applications of Smart Structures Technologies, San Diego, Mar. 2004.

Kornbluh et al., "Rubber to Rigid: Composite Structures with Electronically Controllable Stiffness and Damping," SPIE Smart Structures and Materials 2004: Industrial and Commercial Applications of Smart Structures Technologies, San Diego, Mar. 2004.

Kornbluh et al., Slide presentation, "Rubber to rigid, clamped to undamped: Toward composite materials with wide-range controllable stiffness and damping," SPIE Smart Structures and Materials 2004: Industrial and Commercial Applications of Smart Structures Technologies, San Diego, Mar. 14, 2004.

Kramer et al., "Entanglement Networks of 1,2-Polybutadiene Cross-Linked in States of Strain. I. Cross-Linking at 0°," Macromolecules, vol. 7, No. 1, Jan.-Feb. 1974.

Kramer et al., "Entanglement Networks of 1,2-Polybutadiene Crosslinked in States of Equibiaxial Extension," Journal of Polymer Science: Polymer Physics Edition, vol. 15, pp. 761-763 (1977).

Kudva et al., Overview of the DARPA/AFRL/NASA Smart Wing Phase 2 Program, Smart Structures and Materials, 2001, Industrial and Commercial Applications of Smart Structures Technolohies, Proceedings of SPIE vol. 4332 (2001).

Lampe, Materials Database on Commercially Available Electro-and Magnetorheological Fluids (EF and MRF), available at http://www.tu-dresden.de/mw/ilr/lampe/HAUENG.HTM (1997).

Liu et al., "Tailored Shape Memory Polymers: Not all SMPs are Created Equal," Proceedings of the First World Congress on Biomimetics, Dec. 9-11, 2002, Albuquerque, NM.

Machida et al., "Vibration control by smart structure with electrorheological fluid", in Smart Structures and Materials 2001: Smart Structures and Integrated Systems, L. Porter Davis, ed., Proc. of the SPIE vol. 4327, pp. 176-184. (2001).

Madden et al., "Artificial Muscle Technology: Physical Principals and Naval Prospects", *IEEE Journal of Oceanic Engineering, Special Issue on Biorobotics*, accepted for publication (2004).

Maly et al., "Complex Stiffness Measurement of Vibration-Damped Structural Elements," Presented at the International Modal Analysis Conference, IMAC-XVIII, San Antonio, Texas, Feb. 2000

McGowan et al., "Recent Results from Nasa's Morphing Project", in *Smart Structures and Materials 2002: Industrial and Commercial Applications of Smart Structures Technologies*, ed. A.R. McGowen, Proc. SPIE 4698, pp. 254- 270, 2002.

McKnight et al., "Investigating the Passive Damping Properties of Active Materials," Mechanical and Aerospace Engineering Department, University of California, Los Angeles.

Mercier Des Rochettes et al., "Materials and actuators for the shape control of structures", *in Smart Structures and Materials 2001*: Smart Structures and Integrated Systems, L. Porter Davis, Editor, Proceedings of the SPIE vol. 4327, pp. 67-78 (2001).

Murray, William M., "GB-154 Smart Materials: Technology Assessment Patent Review/Market Potential," from http://www.bccresearch.com/archive/GB 154.html on Jul. 26, 2005.

NewScientist.com news service, "The next 100 years of flight-part two," Dec. 17, 2003.

Park et al., "Ultrahigh strain and piezoelectric behavior in relaxor based ferroelectric single crystals," J. Applied Physics 82, pp. 1804-1811, 1997.

Pelrine et al., "Dielectric Elastomers: Generator Mode Fundamentals and Applications," in *Smart Structures and Materials 2001: Electroactive Polymer Actuators and Devices*, ed. Y. Bar-Cohen, Proc. SPIE 4329, pp. 148-156, 2001.

(56) References Cited

OTHER PUBLICATIONS

Pelrine et al., "High Speed Electrically Actuated Elastomers with Over 100% Strain," *Science* 287:5454, pp. 836-839, 2000.
Pelrine et al., "High-Strain Actuator Materials Based on Dielectric. Elastomers," *Advanced Materials 2000* 12:16, pp. 1223-1225, 2000.
Pornsin-Sirirak et al. "MEMS Wing Technology for a Battery-Powered.Ornithopter," The 13th IEEE International Conference on Micro Electro Mechanical Systems (MEMS '00), Miyazaki, Japan, Jan. 23-27, 2000, pp. 799-804.
Pornsin-Sirirak et al., "Flexible Parylene Actuator for Micro Adaptive Flow Control," The 14th IEEE International MEMS Conference (MEMS '01), Interlaken, Switzerland, Jan. 21-25, 2001, pp. 511-514.
Pornsin-Sirirak et al., "Flexible Parylene-Valved Skin for Adaptive Flow Control," the 15th IEEE International MEMS Conference (MEMS '02), Las Vegas, U.S.A., Jan. 20-24, 2002.
Pornsin-Sirirak et al., "Titanium-Alloy MEMS Wing Technology for a Micro Aerial Vehicle Application," Sensors and Actuators, A: Physical, vol. 89, Issue 1-2, Mar. 20, 2001, pp. 95-103.
Pornsin-Sirirak et al., "Unsteady-state Aerodynamic Performance of MEMS Wings," International Symposium on Smart Structure and Microsystems 2000 (IS3M 2000), The Jockey Club, Hong Kong, Oct. 19-21, 2000.
Prock et al., "Morphing Airfoil Shape Change Optimization with Minimum Actuator Energy as an Objective," 9th AIAA/ISSMO Symposium on Multidisciplinary Analysis and Optimization, Atlanta, GA Sep.-4.
Rao et al., Baverstam Associates' Electronic Newsletter Q2 2003, vol. #3, Issue #2.
Shahinpoor, M., "Micro-electro-mechanics of ionic polymer gels as electrically controllable artifical muscles," J. Intelligent Material Systems and Structures 6, pp. 307-314, 1995.
Simpson et al., "Innovative Materials for Aircraft Morphing," Materials Division, NASA Langley Research Center.
Sommer-Larsen et al., "Polymer Actuators," *Proc. Actuator 2002, 8th International Conf. on New Actuators*, Bremen, Germany (Jun.), pp. 371-378, 2002.
Sproston et al., "Controllable Fluids in 2002-Status of ER and MR Fluid Technology," *Proc. Actuator 2002, 8th International Conf. on New Actuators*, Bremen, Germany (Jun.), pp. 333-338, 2002.
SRI International, DARPA Proposal, "Electrostatic Materials for Tentacles and Reconfigurable Space Structures," Jun. 18, 2004.
SRI International, DARPA Proposal, "Electrostatic Materials for Tentacles and Reconfigurable Space Structures," Quarterly Report, Jan. 2005.
Tobushi et al., "Mechanical properties of shape memory polymer of polyurethane series," JSME International J., Series I, 35:3, 1992.
University of Maryland presentation, "Shape Memory Materials," Mar. 1, 2004.
Unsal et al., "A New Semi-Active Piezoelectric-Based Friction Damper", in Proceedings of SPIE vol. 5052 *Smart Structures and Materials 2003: Damping and Isolation*, ed. G. Agnes, K. Wang (SPIE Bellingham, WA), pp. 413-420 (2003).
Wolons et al., "An Experimental Investigation of the Pseudoelastic Hysteresis Damping Characteristics of Nickel Titanium Shape Memory Alloy Wires," in Proceedings of the AIAA/ASME/ASCE/AHS/ASC Structures, Structural Dynamics, and Materials Conference and Exhibit, 39th, and AIAA/ASME/AHS/ Adaptive Structures Forum, Long Beach, CA, Apr. 20-23, 1998, AIAA Paper 98/2036 (1998).
Xia et al., "Poly(vinylidene fluoride-trifluoroethylene) based high performance electroactive polymers," *Smart Structures and Materials 2003. Electroactive Polymer Actuators and Devices (EAPAD)*, ed. Y. Bar-Cohen, *Proc. SPIE* 5051, pp. 133-142, 2003.
Krape et al., "Applications Study of Electroadhesive Devices," Prepared under Contract No. NAS 1-7303 by Chrysler Corporation Space Division, New Orleans, LA., National Aeronautics and Space Administration, Oct. 1968.
Notice of Allowance dated Aug. 18, 2009 in U.S. Appl. No. 11/078,678.
Notice of Allowance dated Aug. 17, 2009 in U.S. Appl. No. 11/830,806.
Notice of Allowance dated Apr. 7, 2010 for U.S. Appl. No. 11/830,814.
Longo et al., "Control Architecture for the Alicia3 Climbing Robot", Proceedings of the World Automation Congress 2004, Seville Spain, Jun. 2004, pp. 419-424.
Xu et al., "A Wall Climbing Robot for Labelling Scale of Oil Tank's Volume", Robotica, vol. 20, pp. 209-212, Mar. 2002.
DARPA, "Defense Funds 36 Urban Warfighting Technology Projects", News Release, Defense Advanced Research Projects agency, Dec. 17, 2004.

* cited by examiner

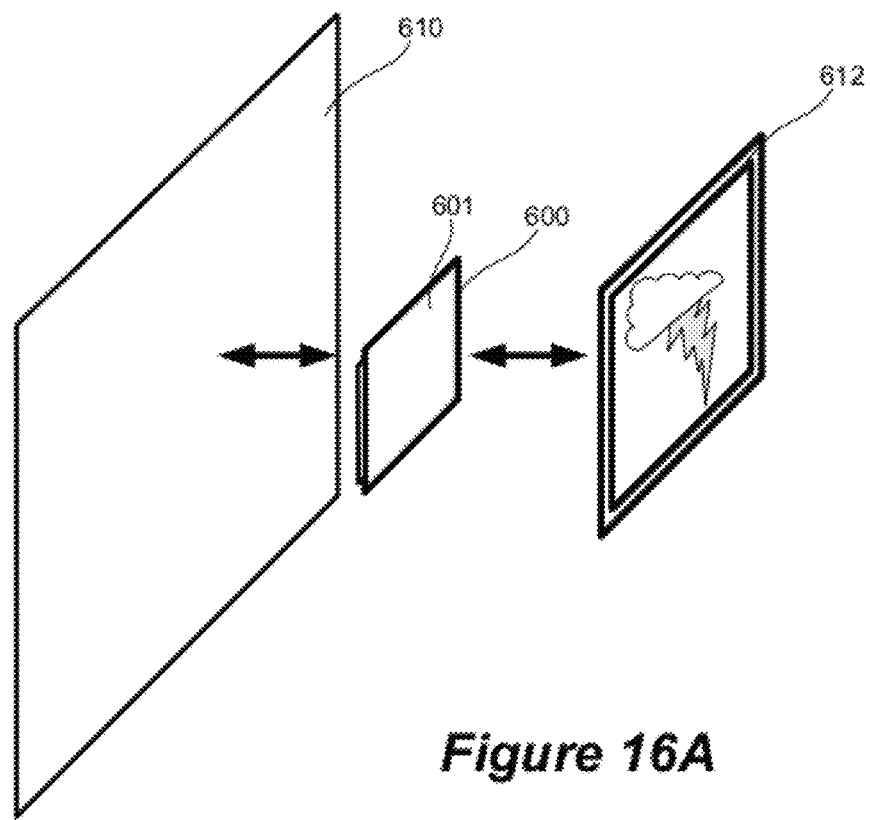
*Figure 16A*
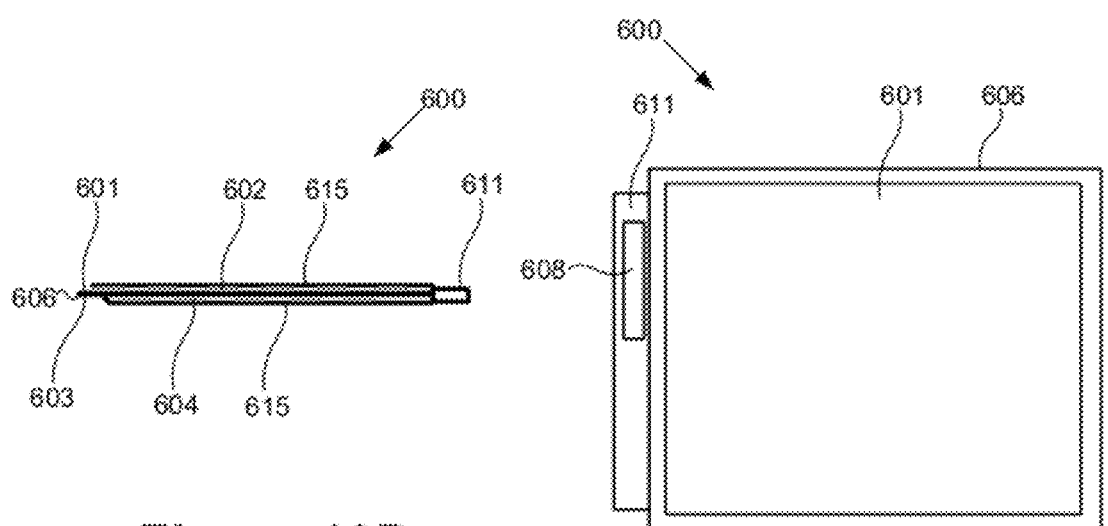
*Figure 16B*
*Figure 16C*

ELECTROADHESIVE DEVICES

CROSS-REFERENCE TO RELATED APPLICATIONS

This application claims priority under 35 U.S.C. §120, and is a continuation of U.S. patent application Ser. No. 12/830,239, filed Jul. 2, 2010 and entitled "Electroadhesive Devices," which in turn claims priority under 35 U.S.C. §120 and is a continuation of U.S. patent application Ser. No. 11/830,814, filed Jul. 30, 2007, now issued as U.S. Pat. No. 7,773,363, and entitled, "Electroadhesion," which in turn claims priority under 35 U.S.C. §120 and is a continuation of U.S. patent application Ser. No. 11/757,922, filed Jun. 4, 2007, now U.S. Pat. No. 7,551,419, and entitled, "Electroadhesion," which claims priority under 35 U.S.C. §119(e) from a) U.S. Provisional Patent Application No. 60/803,953 filed Jun. 5, 2006, and b) U.S. Provisional Patent Application No. 60/866,555 filed Nov. 20, 2006. Each of the foregoing applications is incorporated herein by reference in its entirety and for all purposes.

U.S. GOVERNMENT RIGHTS

This application was made in part with government support under contract number N66001-05-C-8019 awarded by the Department of Defense. The government has certain rights in the invention.

TECHNICAL FIELD

The present invention relates generally to devices and methods that provide electrically controllable adhesion. More particularly, the present invention relates to the use of electrical energy and electrostatic forces to provide adhesive forces between two objects.

BACKGROUND

Controlled adhesion remains an unmet technological need. For example, for over twenty years the robotics field has tried to invent a reliable form of controlled adhesion on a wide range of substrates for wall crawling robots, without success. Success in controlled adhesion can be defined by a technology that is: controllable, reliable, and robust enough to work on a sufficient range of everyday wall and natural materials, and those encountered under real environmental conditions, such as wet or dusty surfaces, highly sloped surfaces, or slippery surfaces.

The existing technologies, many of which are still in the lab and not in commercial production, marked for wall crawling fail to provide the full range of these capabilities. Chemical adhesives are always "on." While they require no energy to perch, robots that employ chemical adhesive clamping technologies require a lot of energy to climb and traverse horizontally (requiring more batteries and weight), fighting the adhesion which cannot be switched off. Chemical adhesive technologies can also attract dust and other debris that quickly reduce their effectiveness. Suction (active or passive) works effectively only on smooth surfaces. Also, conventional suction cups suffer from leaks and cannot manage dusty surfaces. Mechanical claws only work on very rough or penetrable surfaces and often leave damaging marks. Synthetic gecko-like skin can become easily damaged or befouled after repeated use (as few as five cycles), and does not work on wet surfaces.

Controlled adhesion is also useful outside of robotics. Robust devices and methods to provide adhesion would be beneficial.

SUMMARY

The present invention provides electroadhesion technology that permits controllable adherence between two objects. Electroadhesion uses electrostatic forces of attraction produced by an electrostatic adhesion voltage, which is applied using electrodes in an electroadhesive device. The electrostatic adhesion voltage produces an electric field and electrostatic adherence forces. When the electroadhesive device and electrodes are positioned near a surface of an object such as a vertical wall, the electrostatic adherence forces hold the electroadhesive device in position relative to the surface and object. This can be used to increase traction or maintain the position of the electroadhesive device relative to a surface. Electric control of the electrostatic adhesion voltage permits the adhesion to be controllably and readily turned on and off.

In one aspect, the present invention relates to an electroadhesive device configured to adhere to a substrate. The electroadhesive device comprises a deformable surface, a first electrode, a second electrode, and an insulation material. The deformable surface interfaces with a surface of the substrate. The first electrode is configured to apply a first voltage at a first location of the deformable surface. The second electrode is configured to apply a second voltage at a second location of the deformable surface. The difference in voltage between the first voltage and second voltage includes an electrostatic adhesion voltage that produces an electrostatic force between the device and the substrate that is suitable to maintain a current position of the device relative to the substrate. The insulation material is disposed between the first electrode and the second electrode and configured to substantially maintain the electrostatic adhesion voltage difference between the first electrode and the second electrode. The insulation material may be on the electroadhesive device or be part of the substrate.

In another aspect, the present invention relates to an electroadhesive device. The electroadhesive device comprises a first electrode, a second electrode, and a deformable insulation material. The first electrode is configured to apply a first voltage at a first location of the electroadhesive device. The second electrode is configured to apply a second voltage at a second location of the electroadhesive device. The difference in voltage between the first voltage and second voltage includes an electrostatic adhesion voltage that produces an electrostatic force between the device and the substrate that is suitable to maintain a current position of the device relative to the substrate. The deformable insulation material is a) disposed between the first electrode and a surface of the substrate, and/or b) disposed between the second electrode and the substrate surface. The deformable insulation material includes a thickness less than about 2 millimeters between the between the first electrode and a surface of the substrate and between the second electrode and a surface of the substrate.

In yet another aspect, the present invention relates to an electroadhesive device. The electroadhesive device comprises a deformable surface, a first set of electrodes, a second set of electrodes, and an insulation material. The deformable surface interfaces with a surface of a substrate. The first set of electrodes is configured to apply a first voltage within about 2 millimeters of the deformable surface. The second set of electrodes is configured to apply a second voltage within about 2 millimeters of the deformable surface. The insulation material is disposed between electrodes in the first set of electrodes and electrodes in the second set of electrodes and adapted to substantially maintain the electrostatic adhesion voltage difference between the first set of electrodes and the second set of electrodes.

In still another aspect, the present invention relates to a method of adhering a device to a substrate. The method includes applying an electrostatic adhesion voltage difference between a first electrode at a first location of a deformable surface of the device and a second electrode at a second location of the deformable surface. The method also includes adhering the deformable surface to a surface of the substrate using an electrostatic attraction force provided by the electrostatic adhesion voltage difference. The method further includes maintaining the electrostatic adhesion voltage difference between the first electrode and the second electrode while the deformable surface of the device contacts the surface of the substrate.

In another aspect, the present invention relates to a method of adhering a device to a substrate. The method includes applying an electrostatic adhesion voltage difference between a first electrode at a first location of a deformable surface of the device and a second electrode at a second location of the deformable surface. The method also includes adhering the deformable surface to a surface of the substrate using an electrostatic attraction force provided by the electrostatic adhesion voltage difference. The method further includes maintaining the electrostatic adhesion voltage difference between the first electrode and the second electrode while the deformable surface of the device contacts the surface of the substrate. The method additionally includes, after adhering the deformable surface of the device to the surface of the substrate, increasing surface area contact between the deformable surface and the surface of the substrate by deforming the deformable surface.

In yet another aspect, the present invention relates to a method of adhering a device to a first and second substrate. The method includes, for an insulating substrate with a resistivity greater than about $10^{12}$ ohm-cm, a) applying an electrostatic adhesion voltage difference between a first electrode at a first location of the device and a second electrode at a second location of the device, b) maintaining the electrostatic adhesion voltage difference between the first electrode and the second electrode, and c) adhering a surface of the device to a surface of the insulating substrate using an electrostatic attraction force provided by the electrostatic adhesion voltage difference. For a conductive substrate with a resistivity less than about $10^{12}$ ohm-cm, the method also includes steps a), b) and c).

These and other features and advantages of the present invention will be described in the following description of the invention and associated figures.

BRIEF DESCRIPTION OF THE DRAWINGS

The included drawings are for illustrative purposes and serve only to provide examples of possible structures and arrangements for the disclosed systems and methods involving electroadhesion. These drawings in no way limit any changes in form and detail that may be made to the invention by one skilled in the art without departing from the spirit and scope of the invention.

FIGS. 7A-7C illustrate the concept of peeling for an electroadhesive device.

FIGS. 16A-16C show a detachable double-sided electroadhesive device in accordance with another specific embodiment of the present invention.

DETAILED DESCRIPTION

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Electrically Controlled Adhesion

As the term is used herein, 'electroadhesion' refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the traction or friction between two surfaces due to electrostatic forces created by an applied electric field. In one embodiment, electrostatic adhesion of one material to another uses an electric field across an insulating and deformable material.

Conventionally, electrostatic clamping was limited to holding two flat, smooth conductive surfaces together. The inventors have developed electroadhesion devices and techniques that do not limit the material properties or surface roughness of the substrate being adhered to.

Figure 1:
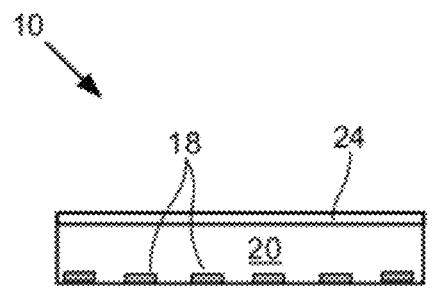
FIG. 1 shows a simplified electroadhesive device in accordance with one embodiment of the present invention.
Figure 2:
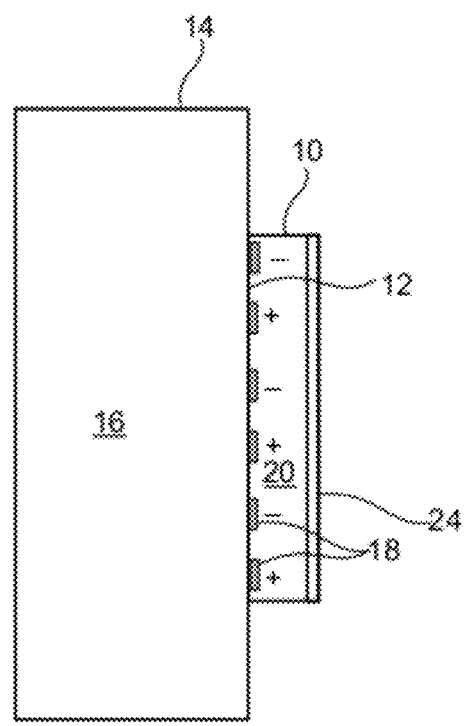
FIG. 2 shows the electroadhesive device of FIG. 1 attached to a surface of a vertical wall.

FIG. 1 shows a simplified electroadhesive device 10 in accordance with one embodiment of the present invention. FIG. 2 shows an electroadhesive device 10 attached to a surface 12. Surface 12 is part of a larger structure 14 that includes material, or substrate, 16, which in this instance resembles a vertical wall. While the present invention will primarily be described as devices and structures, those skilled in the art will also appreciate that the present invention relates to methods of adhering objects using electroadhesion.

Figure 3:
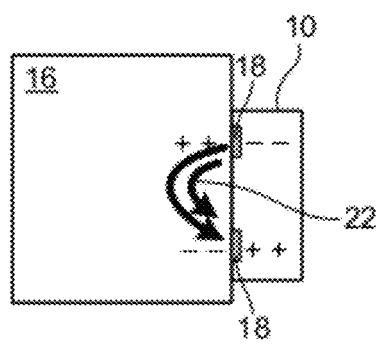
FIG. 3 shows an electric field formed in the substrate of a structure as result of the voltage difference between electrodes in the electroadhesive device of FIG. 1.

An electrostatic adhesion voltage is applied via electrodes 18 using external control electronics (see FIG. 8) in electrical communication with the electrodes 18. As shown in FIG. 2, the electrostatic adhesion voltage uses alternating positive and negative charges on adjacent electrodes 18. As result of the voltage difference between electrodes 18, and as shown in FIG. 3, an electric field 22 forms in the substrate 16 of structure 14. The electric field 22 locally polarizes a dielectric material 16 and thus causes electrostatic adhesion between the electrodes 18 (and device 10) and the induced charges on the substrate 16. The induced charges may be the result of the dielectric polarization or from weakly conductive materials and leakage currents. While not wishing to be bound by theory, the induced electrostatic forces may also use the Johnson-Rahbeck effect to provide increased forces at lower power levels.

Thus, the electrostatic adhesion voltage provides an electrostatic force, between the electroadhesive device 10 and material 16 beneath surface 12, that maintains the current position of device 10 relative to the surface. Suitable electrostatic adhesion voltages will be described in further detail below. For a wall or other relatively vertical surface, the electrostatic force between the electroadhesive device 10 and surface 12 overcomes gravitational pull on the device 10, and holds device 10 aloft. Device 10 may also be attached to other structures and hold these additional structures aloft, or it may be used on sloped or slippery surfaces to increase normal friction forces.

Removal of the electrostatic adhesion voltages from electrodes 18 ceases the electrostatic adhesion force between device 10 and surface 12. Thus, when there is no electrostatic adhesion voltage between electrodes 18, electroadhesive device 10 can move freely relative to surface 12. This condition allows electroadhesive device 10 to move before and after an electrostatic adhesion voltage is applied. Robots and other devices that leverage this control for wall-crawling will be described in further detail below. In addition, as will be expanded upon below, electrical activation and de-activation enables fast adhesion and detachment, such as response times less than about 50 milliseconds, while consuming small amounts of power.

Electroadhesive device 10 of FIG. 1 includes electrodes 18 on the outside surface of insulating material 20 (e.g., they are exposed on the outside surface of insulating material 20 and may contact wall surface 12). This embodiment is well suited for controlled attachment to insulating and weakly conductive materials and substrates 16. Other electroadhesive device 10 relationships between electrodes 18 and insulating material 20 are contemplated and suitable for use with a broader range of materials including conductive materials.

Figure 4A:
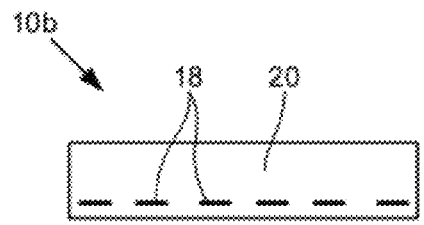
FIG. 4A shows an electroadhesive device with a set of electrodes embedded in an insulating material in accordance with another embodiment of the present invention.
Figure 4B:
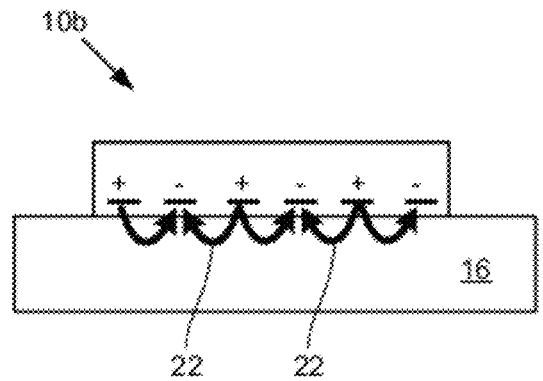
FIG. 4B shows provision of a suitable electrostatic adhesion voltage to electrodes of the electroadhesive device of FIG. 4A and the electric fields that result.

FIG. 4A shows an electroadhesive device 10b with a set of electrodes 18 embedded in the insulating material 20 in accordance with another embodiment of the present invention. FIG. 4B shows provision of a suitable electrostatic adhesion voltage to electrodes 18 of electroadhesive device 10b and the electric fields 22 from charges on electrodes 18 that result when adhering to a substrate 16.

Figure 4C:
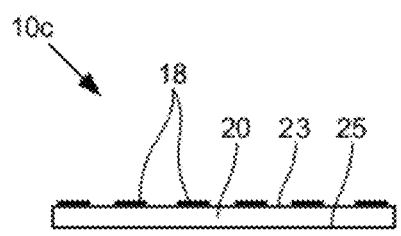
FIG. 4C shows an electroadhesive device with a set of electrodes disposed on an inside surface of an insulating layer in accordance with another embodiment of the present invention.
Figure 4D:
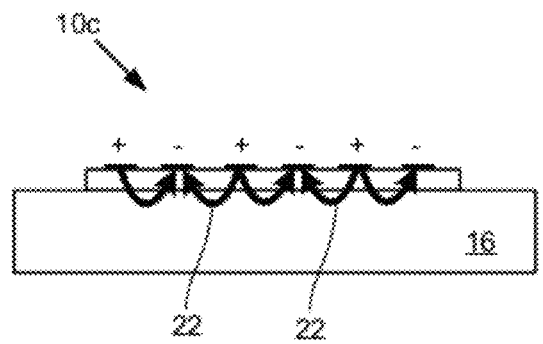
FIG. 4D shows provision of a suitable electrostatic adhesion voltage to electrodes of the electroadhesive device of FIG. 4C and the resultant electric fields.

FIG. 4C shows an electroadhesive device 10c with a set of electrodes 18 disposed on an inside surface 23 of insulating layer 20, opposite to a surface 25 of insulating layer 20 that is meant to contact and adhere to a wall, in accordance with another embodiment of the present invention. FIG. 4D shows provision of a suitable electrostatic adhesion voltage to electrodes 18 of electroadhesive device 10c and the resultant electric fields 22 from charges on electrodes 18.

Figure 4E:
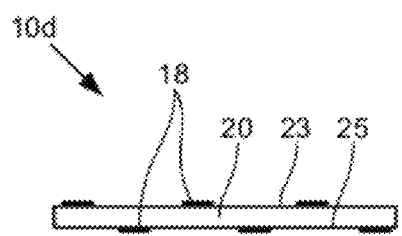
FIG. 4E shows an electroadhesive device with a first set of electrodes disposed on an inside surface of insulating layer, and a second set of electrodes disposed on the opposite surface of the insulating layer, in accordance with another embodiment of the present invention.

FIG. 4E shows an electroadhesive device 10d with a first set 40 of electrodes 18 disposed on an inside surface 23 of insulating layer 20, and a second set 42 of electrodes disposed on the opposite surface 25 of insulating layer 20, in accordance with another embodiment of the present invention.

Figure 4F:
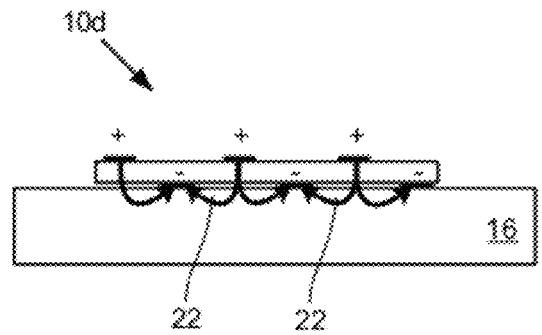
FIG. 4F shows electric fields for the electroadhesive device of FIG. 4E.

FIG. 4F shows the resultant electric fields 22 from charges on electrodes 18 for electroadhesive device 10d.

Expanding upon electroadhesive attraction, the exact mechanism for force generation will depend on conductivity and dielectric constant of material 16 under surface 12. Notably, the present invention is not limited by the electrical characteristics of the substrate being adhered to, even though electroadhesion is largely based on electrical principles. Indeed, electroadhesion as described herein works well for both conductive and non-conductive (or insulating) substrates 16.

Returning back to FIGS. 2 and 3, when material 16 acts as an insulator for the voltage difference between the alternate positive and negative charges applied by electrodes 18, electric fields 22 from charges on electrodes 18 polarize a dielectric and insulating substrate and thus cause electrostatic adhesion between electroadhesive device 10 and the induced polarization charges in material 16 of structure 14.

However, when material 16 is conductive, free charge flows within substrate 16, and the charged electrodes 18 are attracted to the conductive material by electrostatic forces. The same mechanism also applies to a damp and insulating substrate 16, where the moisture or other conductive particles lodged in the surface act as a conductive surface on an otherwise insulating material. Of course, if substrate 16 is too conductive the control electronics may not be able to maintain an adequate electroadhesion voltage and an insulated embodiment such as that shown in FIG. 4A is used.

While the electroadhesive device 10 attaches well to both conductive and insulating substrates 16, it may be helpful to distinguish between the two to help show the range of materials that device 10 can attach to. A conductive material may be defined as a material with a resistivity less than about $10^{12}$ ohm-cm. An insulating material may be defined as a material with a resistivity greater than about $10^{12}$ ohm-cm. For this definition, the conductive materials include true conductors such as metals and also semiconductive materials and materials such as concrete, most woods and rock that would ordinarily be thought of as insulating. However, as will be described, the practical boundary between insulating and conductive materials depends in part on the geometry and feature sizes of the electroadhesive device.

Notably, then, for the same electroadhesive devices discussed so far, the same electroadhesive device 10 geometry and operation (apply electrostatic adhesion voltages to electrodes 18) can be used to clamp to both insulating and conductive substrates. This represents one distinguishing feature of electroadhesive device 10.

Figure 4G:
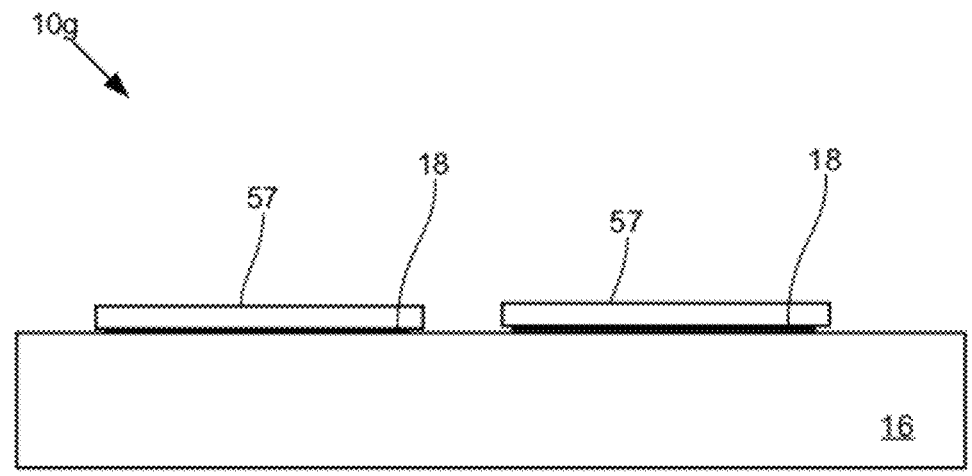
FIG. 4G shows an electroadhesive device in accordance with another embodiment of the present invention.
Figure 4H:
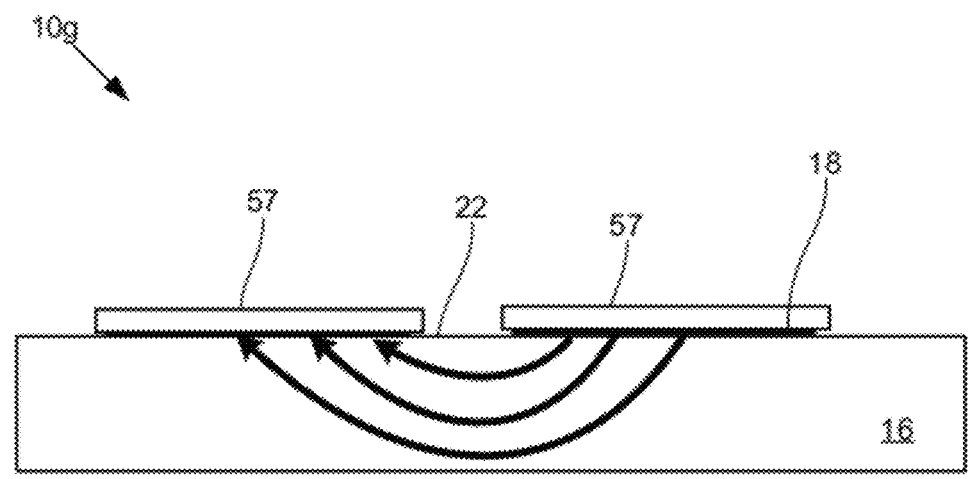
FIG. 4H shows the resultant electric fields for electroadhesive device.

In some cases, the electroadhesive device is designed to use the substrate as an insulation material. FIG. 4G shows an electroadhesive device 10g in accordance with another embodiment of the present invention. FIG. 4H shows the resultant electric fields 22 for electroadhesive device 10g.

Electro adhesive device 10g includes two electrodes 18 that directly contact substrate 16. Electrodes 18 attach to mechanically separate pads 57. For example, each pad 57 may be included in a separate foot of a robot.

Notably, for electroadhesive device 10g, there is no insulation material 20 between the electrodes 18 included in the electroadhesive device. In this instance, substrate 16 acts as an insulation material between the electrodes. This design still permits electroadhesive forces to be generated, but does not work on conductive substrates 16 (insulation material between one or both of the electrodes 18 may then be used, such as shown in FIGS. 4A-4F).

Another distinguishing feature of electroadhesive devices described herein is the option to use deformable surfaces and materials in electroadhesive device 10 as shown in FIG. 5. In one embodiment, one or more portions of electroadhesive device 10 are deformable. In a specific embodiment, this includes surface 30 on device 10. In another embodiment, insulating material 20 between electrodes 18 is deformable. Electroadhesive device 10 may achieve the ability to deform using material compliance (e.g., a soft material as insulating material 20) or structural design (e.g., see cilia or hair-like structures shown in FIG. 6C or tracks 352 in FIG. 10A). In a specific embodiment, insulating material 20 includes a bendable but not substantially elastically extendable material (for example, a thin layer of mylar). In another embodiment insulating material 20 is a soft polymer with modulus less than about 10 MPa and more specifically less than about 1 MPa.

Figure 5A:
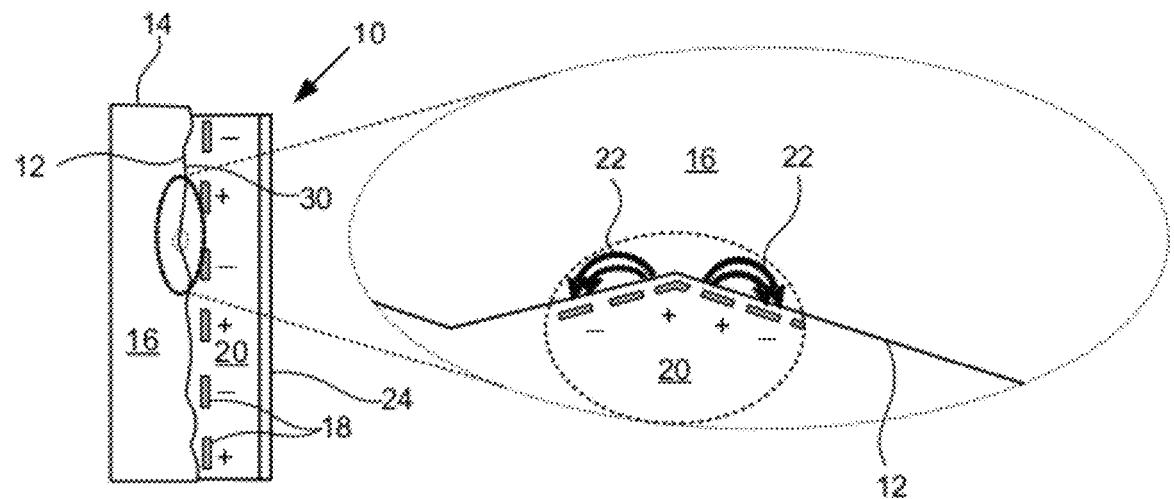
FIG. 5A shows a deformable electroadhesive device conforming to the shape of a rough surface in accordance with a specific embodiment of the present invention.

Electrodes 18 may also be compliant. Compliance for insulating material 20 and electrodes 18 may be used in any of the electroadhesive device arrangements 10 described above. Compliance in electroadhesive device 10 permits an adhering surface 30 of device 10 to conform to surface 12 features of the object it attaches to. FIG. 5A shows a compliant electroadhesive device 10 conforming to the shape of a rough surface 12 in accordance with a specific embodiment of the present invention.

Adhering surface 30 is defined as the surface of an electroadhesive device that contacts the substrate surface 12 being adhered to. The adhering surface 30 may or may not include electrodes. In one embodiment, adhering surface 30 includes a thin and compliant protective layer that is added to protect electrodes that would otherwise be exposed. In another embodiment, adhering surface 30 includes a material that avoids retaining debris stuck thereto (e.g., when electrostatic forces have been removed). Alternatively, adhering surface 30 may include a sticky or adhesive material to help adhesion to a wall surface or a high friction material to better prevent sliding for a given normal force.

Compliance in electroadhesive device 10 often improves adherence. When both electrodes 18 and insulating material 20 are able to deform, the adhering surface 30 may conform to the micro- and macro-contours of a rough surface 12, both initially and dynamically after initial charge has been applied. This dynamic compliance is described in further detail with respect to FIG. 5B. This surface electroadhesive device 10 compliance enables electrodes 18 get closer to surface 12, which increases the overall clamping force provided by device 10. In some cases, electrostatic forces may drop off with distance (between electrodes and the wall surface) squared. The compliance in electroadhesive device 10, however, permits device 10 to establish, dynamically improve and maintain intimate contact with surface 14, thereby increasing the applied holding force applied by the electrodes 18. The added compliance can also provide greater mechanical interlocking on a micro scale between surfaces 12 and 30 to increase the effective friction and inhibit sliding.

The compliance permits electroadhesive device 10 to conform to the wall surface 12 both initially—and dynamically after electrical energy has been applied. This dynamic method of improving electroadhesion is shown in FIGS. 5B-5C in accordance with another embodiment of the present invention.

Figure 5B:
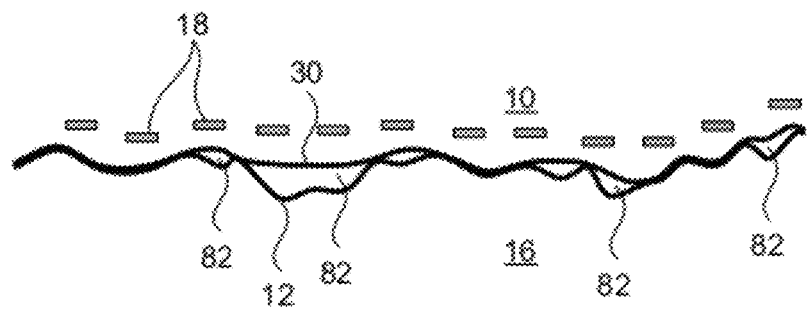
FIG. 5B shows a surface of a deformable electroadhesive device initially when the device is brought into contact with a surface of a structure in accordance with a specific embodiment of the present invention.
Figure 5C:
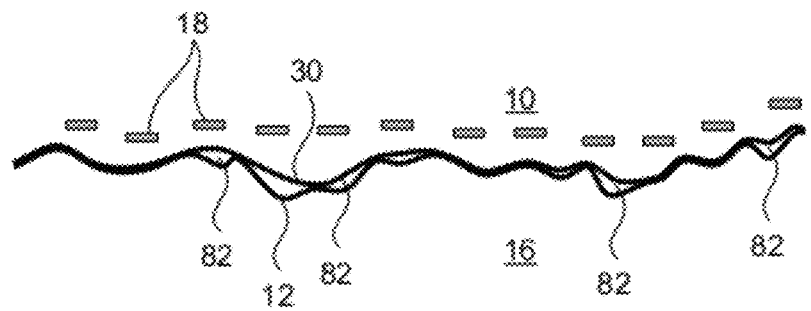
FIG. 5C shows the surface shape of electroadhesive device of FIG. 5B and wall surface after some deformation in the electroadhesive device due to the initial force of electrostatic attraction and compliance.

FIG. 5B shows a surface 30 of electroadhesive device 10 initially when the device 10 is brought into contact with surface 12 of a structure with material 16. Surface 12 may include roughness and non-uniformities on a macro, or visible, level (for example, the roughness in concrete can easily be seen) and a microscopic level (most materials).

At some time when the two are in contact as shown in FIG. 5B, electroadhesive electrical energy is applied to electrodes

18. This creates a force of attraction between electrodes 18 and wall surface 12. However, initially, as a practical matter for most rough surfaces, as can be seen in FIG. 5B, numerous gaps 82 are present between device surface 30 and wall surface 12.

The number and size of gaps 82 affects electroadhesive clamping pressures. For example, at macro scales electrostatic clamping is inversely proportional to the square of the gap between the substrate 16 and the charged electrodes 18. Also, a higher number of electrode sites allows device surface 30 to conform to more local surface roughness and thus improve overall adhesion. At micro scales, though, the increase in clamping pressures when the gap is reduced is even more dramatic. This increase is due to Paschen's law, which states that the breakdown strength of air increases dramatically across small gaps. Higher breakdown strengths and smaller gaps imply much higher electric fields and therefore much higher clamping pressures. The inventors have determined that clamping pressures may be increased, and electroadhesion improved, by using a compliant surface 30 of electroadhesive device 10, or an electroadhesion mechanism that conforms to the surface roughness.

When the force of attraction overcomes the compliance in electroadhesive device 10, these compliant portions deform and portions of surface 30 move closer to surface 12. This deformation increases the contact area between electroadhesive device 10 and wall surface 12, increases electroadhesion clamping pressures, and provides for stronger electroadhesion between device 10 and wall 14. FIG. 5C shows the surface shape of electroadhesive device 10 and wall surface 12 after some deformation in electroadhesive device 10 due to the initial force of electrostatic attraction and compliance. Many of the gaps 82 have become smaller.

This adaptive shaping may continue. As the device surface 30 and wall surface 12 get closer, the reducing distance therebetween in many locations further increases electroadhesion forces, which causes many portions of electroadhesive device 10 to further deform, thus bringing even more portions of device surface 30 even closer to wall surface 12. Again, this increases the contact area, increases clamping pressures, and provides for stronger electroadhesion between device 10 and wall 14. The electroadhesive device 10 reaches a steady state in conformity when compliance in the device prevents further deformation and device surface 30 stops deforming.

In another embodiment, electroadhesive device 10 includes porosity in one or more of electrodes 18, insulating material 20 and backing 24. Pockets of air may be trapped between surface 12 and surface 301; these air pockets may reduce adaptive shaping. Tiny holes or porous materials for insulator 20, backing 24, and/or electrodes 18 allows trapped air to escape during dynamic deformation.

Thus, electroadhesive device 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters.

An optional backing structure 24, as shown in FIG. 1, 2, or 5A, attaches to insulating material 20, includes a rigid or non-extensible material, and provides structural support for the compliant electroadhesive device 10b. Backing layer 24 also permits external mechanical coupling to electroadhesive device 10b to permit the device to be used in larger devices, such as wall-crawling robots and other devices and applications described below.

With some electroadhesive devices 10, softer materials may warp and deform too much under mechanical load, leading to suboptimal clamping. To mitigate these effects, electroadhesive device 10 may include a graded set of layers or materials, where one material has a low stiffness or modulus for coupling to the wall surface and a second material, attached to a first passive layer, which has a thicker and/or stiffer material. Backing structure 24 may attach to the second material stiffer material. In a specific embodiment, electroadhesive device 10 included an acrylic elastomer of thickness approximately 50 microns as the softer layer and a thicker acrylic elastomer of thickness 1000 microns as the second support layer. Other thicknesses may be used.

The time it takes for the changes of FIGS. 5B and 5C may vary with the electroadhesive device 10 materials, electroadhesive device 10 design, the applied control signal, and magnitude of electroadhesion forces. The dynamic changes can be visually seen in some electroadhesive devices. In one embodiment, the time it takes for device surface 80 to stop deforming is between about 0.01 seconds and about 10 seconds. In other cases, the conformity ceasing time is between about 0.5 second and about 2 seconds.

In some embodiments, electroadhesion as described herein permits fast clamping and unclamping times and may be considered almost instantaneous. In one embodiment, clamping or unclamping may be achieved in less than about 50 milliseconds. In a specific embodiment, clamping or unclamping may be achieved in less than about 10 milliseconds. The speed may be increased by several means. If the electrodes are configured with a narrower line width and closer spacing then speed is increased using conductive or weakly conductive substrates because the time needed for charge to flow to establish the electroadhesive forces is reduced (basically the "RC" time constant of the distributed resistance-capacitance circuit including both electroadhesive device and substrate is reduced). Using softer, lighter, more adaptable materials in device 10 will also increase speed. It is also possible to use higher voltage to establish a given level of electroadhesive forces more quickly, and one can also increase speed by overdriving the voltage temporarily to establish charge distributions and adaptations quickly. To increase unclamping speeds, a driving voltage that effectively reverses polarities of electrodes 18 at a constant rate may be employed. Such a voltage prevents charge from building up in substrate material 16 and thus allows faster unclamping. Alternatively, a moderately conductive material 20 can be used between the electrodes 18 to provide faster discharge times at the expense of some additional driving power required.

As the term is used herein, an electrostatic adhesion voltage refers to a voltage that produces a suitable electrostatic force to couple electroadhesive device 10 to a wall or substrate. The minimum voltage needed for electroadhesive device 10 will vary with a number of factors, such as: the size of electroadhesive device 10, the material conductivity and spacing of electrodes 18, the insulating material 20, the wall material 16, the presence of any disturbances to electroadhesion such as dust, other particulates or moisture, the weight of any structures mechanically coupled to electroadhesive device 10, compliance of the electroadhesive device, the dielectric and resistivity properties of the substrate, and the relevant gaps between electrodes and substrate. In one embodiment, the electrostatic adhesion voltage includes a differential voltage between the electrodes 18 that is between about 500 volts and about 10 kilovolts. In a specific embodiment, the differential voltage is between about 2 kilovolts and about 5 kilovolts. Voltage for one electrode can be zero. Alternating positive and negative charges may also be applied to adjacent electrodes 18. Further description of electrical circuits and electrical performance of electroadhesive device 10 is described in the next section of this patent application.

The resultant clamping forces will vary with the specifics of a particular electroadhesive device 10, the material it adheres to, any particulate disturbances, wall surface roughness, etc. In general, electroadhesion as described herein provides a wide range of clamping pressures, generally defined as the attractive force applied by the electroadhesive device divided by the area of the electroadhesive device in contact with the wall. For purposes of illustration, clamping forces for electroadhesion can be simplified in terms of the normal clamping pressure ($P_N$), the friction coefficient ($\mu$) between substrate and clamp, and the effective lateral adhesion pressure ($P_L$). The effective lateral adhesion pressure $P_L$ represents the measured maximum lateral force without slippage divided by the area of surface 30. The three quantities are related by:

$$P_L = \mu P_N \quad \text{(Equation 1)}$$

$P_L$ is important for wall climbing applications, where gravity exerts a lateral force on the electroadhesive device 10, and it can be increased either by increasing the normal clamping pressure $P_N$, or by increasing the friction coefficient. $P_N$ is the important for mobility on a ceiling where gravity exerts a normal force opposite to the electroadhesive device 10.

The actual electroadhesion forces and pressure will vary with design and a number of factors. In one embodiment, electroadhesive device 10 provides electroadhesive attraction pressures between about 0.7 kPa (about 0.1 psi) and about 70 kPa (about 10 psi). In a specific embodiment, electroadhesive device 10 provides pressures between about 2 kPa (about 0.3 psi) and about 20 kPa (about 3 psi). The amount of force needed for an application may then be readily achieved by varying the contacting and active surface 30 of electroadhesive device 10. In general, increasing the voltage increases electroadhesion forces. Also, decreasing the distance between the electrodes and surface increases electroadhesion forces. Further, increasing the active contact surface 30 and electroadhesive device size increases electroadhesion forces. For robotic applications described below, the electroadhesive device sizes used for each robot will depend on a number of factors such as the number of pads used, robot weight, and robust factors (e.g., a multiplier of 1.5-10 for robust operation). For example, a clamping pressure of 0.125 psi can carry a 11b robot with two square pads of dimensions 2 inches on each side, not including a safety factor for robust operation.

One suitable solution to overcome less than ideal situations (e.g., dust, difficult materials, rough surfaces, extremely wet surfaces, etc.) is simply to increase the electroadhesive device 10 area until sufficient clamping force is achieved despite the wall disturbances. Since the electroadhesive devices 10 are light, increasing their area is unlikely to result in a significant increase in the overall weight of a robot for example.

For robots, increasing clamping pressures or electroadhesive device sizes provides margins to accommodate less than ideal surfaces and situations (e.g., rough surfaces, dust, etc.) and unpredictable disturbances on the robot. It also decreases power requirements (by allowing lower voltage operation for the same clamping pressure), allows greater payloads, and permits faster and more robust locomotion. In addition, one can simply attach a large or additional electroadhesive devices 10 to the other areas of a robot to enhance adhesive abilities.

So far, the present invention has been described in the context of a single contact surface 30 attaching to a wall for electroadhesive device 10. Multiple surfaces 30 are also suitable for use in a single electroadhesive device 10. When commonly attaching to a single wall, the multiple surfaces 30 may operate in concert for a single device 10, and thus reduce the forces and size for each individual surface 30. For example, a robot may include two or more electroadhesive surfaces 30 coupled to a robotic actuator that is configured to position the surfaces 30 on a wall surface.

Figure 6A:
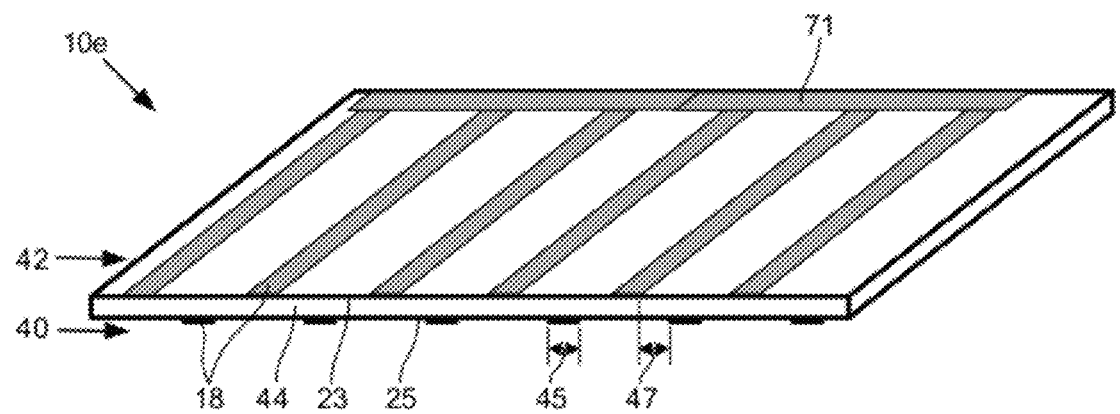
FIG. 6A shows an electroadhesive device with patterned electrodes in accordance with another embodiment of the present invention.

The electrodes 18 may also be enhanced by various means, such as patterned on an adhesive device surface to improve electroadhesive performance. FIG. 6A shows an electroadhesive device 10e in accordance with another embodiment of the present invention. Electroadhesive device 10e includes interdigitated top and bottom electrodes sets 40 and 42 on opposite sides of an insulating layer 44. In some cases, the electrodes as well as the insulating layer 44 may be compliant and composed of elastomers to increase compliance. In one preferred embodiment the modulus of the elastomers is below about 10 MPa and in another preferred embodiment it is more specifically below about 1 MPa.

Electrode set 42 is disposed on a top surface 23 of insulating layer 44, and includes an array of linear patterned electrodes 18. A common electrode 71 electrically couples electrodes 18 in set 42 and permits electrical communication with all the electrodes 18 in set 42 using a single input lead to common electrode 71.

Electrode set 40 is disposed on a bottom surface 25 of insulating layer 44, and includes a second array of linear patterned electrodes 18 that is laterally displaced from electrodes 18 on the top surface. Set 40 may also include a common electrode (not shown).

The pitch, or planar spacing between individual electrodes 18 in sets 40 and 42, may vary. The spacing in the cross section shown may be characterized by electrode width 45 and pitch 47. Pitch 47 represents the spacing between electrodes of different polarities, whether they are on the same or different side of the insulating layer 44. In a specific embodiment, electroadhesive device 10e includes compliant carbon electrodes with an about 1 millimeter electrode width 45 and an about 1 millimeter pitch 47 between the electrodes. Other line widths and pitches are suitable for use. In another embodiment, pitch 47 is about 1 centimeter. Generally speaking, narrower pitches 47 and widths 45 allow faster clamping to more insulating or resistive substrates, while wider pitches 47 and widths 45 attract the electroadhesive device 10 to the substrate from a greater distance. In one embodiment, the pitch between the electrodes can be non-uniform along the length of the clamp 10 to allow a variety of geometric electric fields to be setup. In another embodiment, the electrodes can be arranged in different two-dimensional geometry (e.g. concentric rings).

Electrodes can be patterned on opposite sides of an insulating layer 44 to increase the ability of the electroadhesive devices 10e and 10f to withstand higher voltage differences without being limited by breakdown in the airgap between the electrodes. Typically, when the electrodes 18 are patterned on opposite sides of an insulator layer 44, the electrode 18 spacing in each set 40 and 42 is much greater than the thickness of the elastomeric layer 44 (which has been exaggerated in the drawings for purposes of illustration, along with exaggerating the thickness of the electrodes, which may be only several micrometers thick). An 'aspect ratio' is defined as the ratio of the electrode geometry: electrode 18 spacing to thickness, t, of insulator material 20 separating the electrodes 18 (47:t). The aspect ratio influences clamping pressures. Larger aspect ratios ensure a substantially planar distribution of electric field sources. Smaller electrode spacing ensures better contact with a substrate attached to either side of electroadhesive device 10e.

Insulating layer 44 is relatively planar, includes opposing surfaces 23 and 25, and comprises insulating material 20. In one embodiment, insulating layer 44 is compliant and conforms to forces applied thereto. In a specific embodiment, insulating layer 44 includes a thickness less than about 2 millimeters. In another specific embodiment, insulating layer 44 includes a thickness less than about 0.1 millimeters. Layer 44 may also include a material such as mylar that is bendable but not substantially stretchable.

An acrylic elastomer is suitable for use as insulating layer 44. The acrylic elastomer may be pre-strained to increase its dielectric strength. Pre-strain of a polymer may be described, in one or more directions, as the change in dimension in a direction after pre-straining relative to the dimension in that direction before pre-straining. The pre-strain may comprise elastic deformation of polymer and be formed, for example, by stretching the polymer in tension and fixing one or more of the edges while stretched. In one embodiment, the pre-strain is elastic. An elastically pre-strained polymer could, in principle, be unfixed and return to its original state. The pre-strain may be imposed at the boundaries using a rigid frame or may also be implemented locally for a portion of the polymer. In one embodiment, pre-strain is applied uniformly over a portion of the polymer to produce an isotropic pre-strained polymer, e.g., 300% by 300% in both directions. Pre-strain suitable for use with the present invention is further described in U.S. Pat. No. 7,034,432, which is incorporated by reference for all purposes.

In one embodiment to improve clamping forces, electroadhesive device 10e reduces the thickness of insulating layer 44 and/or the pitch 47 between electrodes 18 to help the device 10e better conform to surface roughness of a wall surface 12. This brings the opposite polarity electrodes closer to the substrate material 16 and thus increase the field effects. In a specific embodiment, device 10e includes a 16 micron thick dielectric material with electrode spacing 47 of about 1 millimeter.

Figure 6B:
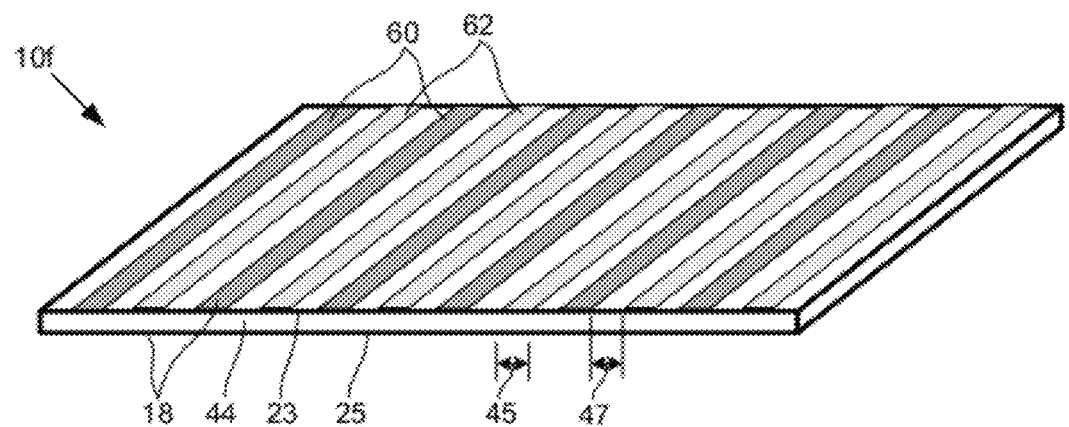
FIG. 6B shows an electroadhesive device with patterned electrodes in accordance with another embodiment of the present invention.

The electrodes 18 may also be patterned on the same surface of insulating layer 44. FIG. 6B shows an electroadhesive device 10f in accordance with another embodiment of the present invention. Electroadhesive device 10f includes interdigitated electrodes sets 60 and 62 on the same surface 23 of a compliant insulating layer 44.

This embodiment decreases the distance between the positive electrodes 18 in set 60 and negative electrodes 18 in set 62, and allows the placement of both sets of electrodes on the same surface of electroadhesive device 10e. Functionally, this eliminates the spacing between the electrodes sets 60 and 62 due to insulating layer 44. It also eliminates the gap between one set of electrodes (previously on the bottom surface 25) and the wall surface 12 when the top surface 23 attaches to the wall. Both of these changes increase electroadhesive forces between electroadhesive device 10e and the attaching substrate 16.

Figure 6C:
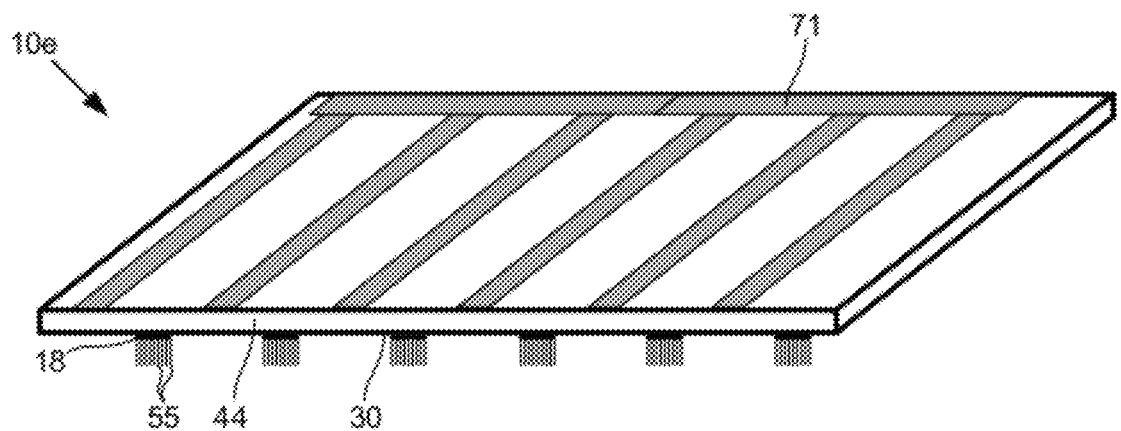
FIG. 6C shows a variation of the device of FIG. 6A device using conducting cilia in accordance with another specific embodiment of the present invention.

Patterning electrodes 18 at micrometer scales also provide an increase in clamping pressures. Another embodiment for micromachining involves patterning electrodes into insulated "cilia" hair-like structures, or scales. FIG. 6C shows an electroadhesion device 10i, a variation of the device 10e, using conducting cilia 55 in accordance with another specific embodiment of the present invention. Cilia 55 include small deformable fiber-like structures the increase intimate contact with a rough surface 12 (from FIG. 5).

In one embodiment, each electroadhesion cilium 55 has two electrodes embedded in a dielectric insulator such as silicone. The electroadhesion cilia then conform to local surface roughness on wall surface 12, while the flexible backing, such as insulating layer 44, to which the electroadhesion cilia attaches, conforms to global irregularities in a wall surface 12. In another specific embodiment, a conducting wire with an insulating coating is coated with another conductive layer. In this case, the electroadhesive voltage is applied between the inner core electrode and the outer ring through the insulating coating. In the embodiment of FIG. 6C, each cilium 55 has only one electrode and the cilia are simply deformable and compliant hair-like structures connected to the flat electrodes similar to those in FIG. 6A or 6B. The cilia in this embodiment may be coated with an insulator (not shown) depending on an anticipated conductivity of a substrate being adhered to. Geometries such as these, which can be implemented via micromachining and in some cases using traditional molding or hand assembly techniques depending on the scale, allow the effective gap between the wall surface 12 and electrodes in electroadhesion cilia to decrease, both initially and dynamically, as described above, thus enabling large clamping pressures and electroadhesive forces. Resistance to peeling forces is also increased using cilia because of their large total peel line (each cilia has a high perimeter length relative to it's cross sectional area compared to a larger structure).

Increases in clamping pressures provided with patterned electrodes 18 may be varied and increased by design. In one embodiment, the size 45 and pitch 47 between electrodes 18 in the electroadhesive device is reduced to increase field strength per unit area. In general, the electroadhesive forces are proportional to the average of the square of the field strength. Increasing size and spacing between electrodes 18 also decreases weak or dead zones in the field distribution. In another embodiment, the insulating material 20 of layer 44 is selected or altered to minimize internal charge leakage through the electroadhesive devices. This also decreases the power requirement for clamping. A material may also be added as the adhering surface of the device and selected to increase friction coefficients, thereby increasing the effective lateral clamping pressure even for the same normal clamping pressure.

Figure 4I:
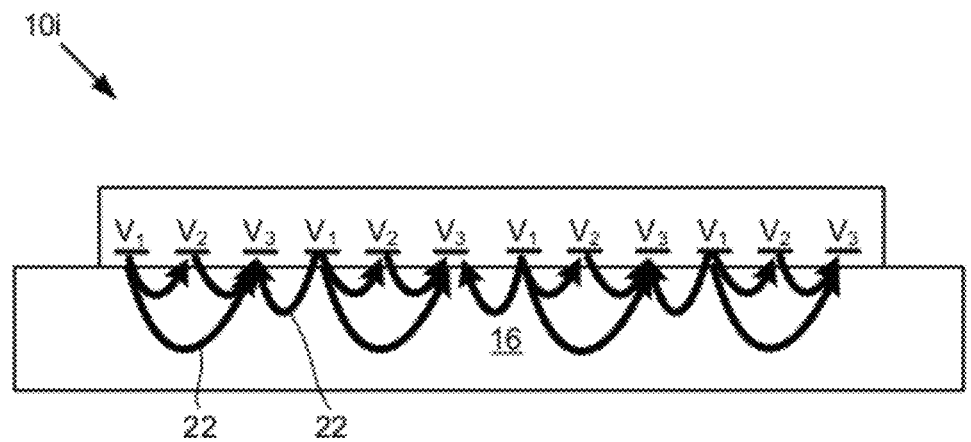
FIG. 4I shows an electroadhesive device in accordance with another embodiment of the present invention.

So far, the electroadhesive devices have been described with respect to two using voltages. More complication electrical provisions are contemplated. FIG. 4I shows an electroadhesive device 10i in accordance with another embodiment of the present invention.

Electroadhesive device 10i includes a combination of multiple voltages applied to the electrodes 18. In this case, three voltages are alternated on the electrodes 18: $V_1$, $V_2$, and $V_3$. For example, $V_1$ may be about 5 kilovolts, $V_2$ may be about 0 volts, while $V_3$ is about minus (−)5 kilovolts. This creates fractal electric fields 22 due to charges on the electrodes of varying strengths in the substrate 16, as shown in FIG. 4I. Fractal electric fields refer to electric fields of different strengths created by the electrodes and voltages applied thereto. More than three voltage levels may be used, along with other spacing arrangements of the electrodes.

Figure 4J:
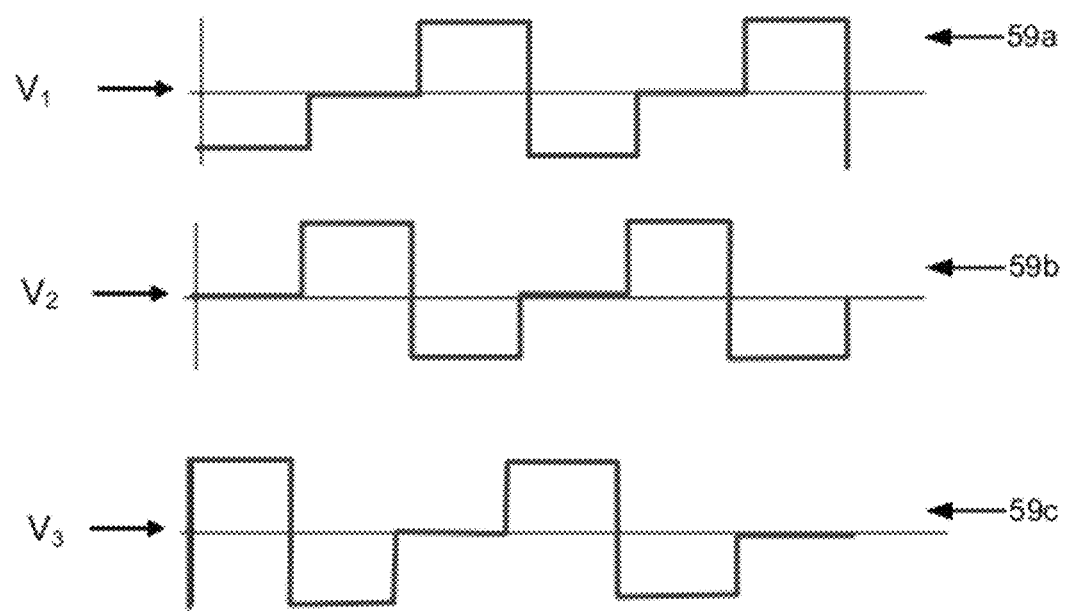
FIG. 4J shows one suitable example of phase shifted input for the three voltage pattern of FIG. 4I in accordance with a specific embodiment of the present invention.

Another embodiment to create fractal electric fields 22 of varying electric field strengths in the substrate 16 is to apply phase shifted input to electrodes 18. In this case, a control circuit applied time varying voltages 59a-59c to the electrodes 18. One suitable example of phase shifted input for the three voltage pattern of FIG. 4I is shown in FIG. 4J. Other varying voltage patterns are also suitable for use. Changing pitch between the electrodes may also achieve fractal electric fields 22 of varying strengths as shown.

A multi-modal approach to increasing adhesion forces combines electroadhesion with existing wall-crawling methods. For example, small angled spikes (that embed into a surface) may be added to an electroadhesion clamping device 10 to added greater lateral forces that oppose gravity and allow for forward motion.

A second hybrid adhesion embodiment involves the use of electroadhesion in combination with a suction cup. For example, the suction cup may include an electroadhesive device about the perimeter of a ring for the cup, which increases the ability for the perimeter to maintain intimate contact with a wall surface, thereby reducing leaks and improves suction forces. The suction cup may be actuated by any suitable suction cup technology, such as pneumatic means, pumps, or electroactive polymer actuation.

Figure 7C:
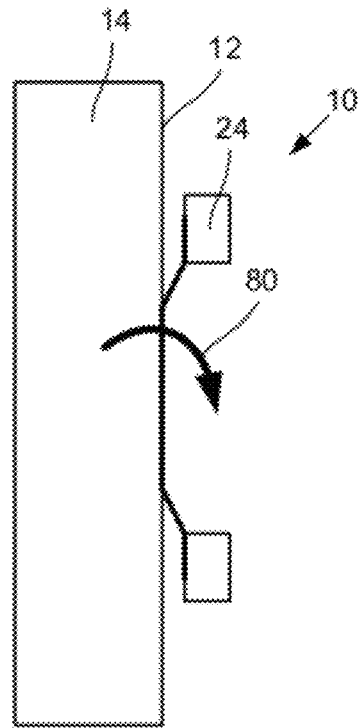
Figure 7C:
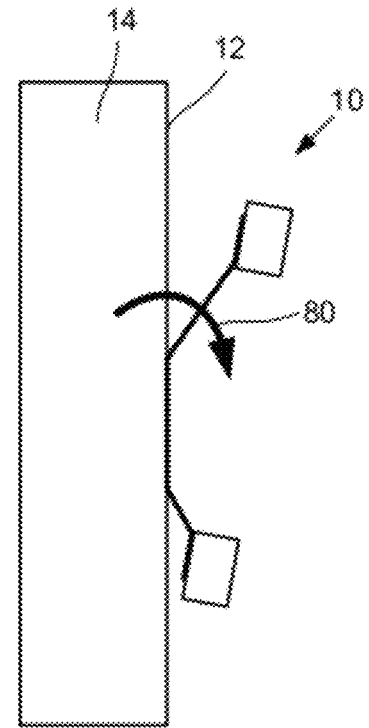
Figure 7C:
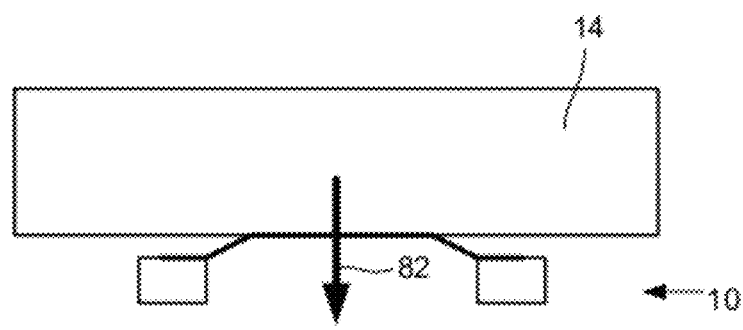

Electroadhesive devices 10 may also be modified to increase resistance to peeling. FIGS. 7A-7C illustrate the concept of peeling for an electroadhesive device 10. FIGS. 7A and 7C illustrate when peeling may be encountered, and the resultant peeling moment 80 and force 82 for a vertical wall and ceiling, respectively.

As described above, electroadhesive device 10 has strong force capability perpendicular and parallel to wall 14, but may be sensitive to peeling forces and moments that cause rotation and detachment of a portion of the device 10 away from the wall 14, such as the clockwise peeling moment 80 shown in FIG. 7B. The force required to peel an electroadhesion device 10 off a substrate depends on the electroadhesive forces (such as measured by clamping pressure) and on the length of the peeling line (i.e. the length of the line in the peeling zone that defines detached areas from attached areas). The minimum force required to peel the electroadhesive device 10 off a substrate is its minimum peeling force for that substrate as defined here.

In addition to a high minimum peeling force for device 10, it is often beneficial to have a high total peel energy. The total peel energy as defined here is the mechanical energy required to detach electroadhesion device 10 from a substrate. By analogy to the strength of materials, total peel energy may be considered a measure of peel toughness whereas minimum peel force is a measure of peel strength. The total peel energy may often be approximated by the minimum peel force times the distance device 10 must be pulled to remove it by peeling. The compliant and elastic features of this invention are particularly useful for increasing total peel energy. If, for example, the compliance comes from soft elastomer layers, flaps, or cilia, and if the peel force is enough to appreciably stretch these elastic features, then the total peel energy is increased by the elastic stretching energy. A high total peel energy is helpful in these instances because it makes the device 10 more able to resist disturbances such as temporary shocks, jolts, and vibration.

Figure 7D:
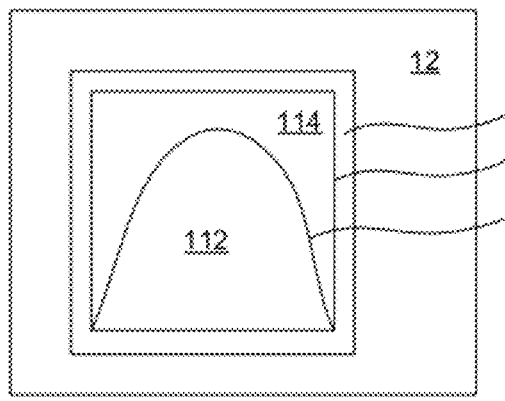
FIGS. 7D and 7E show partial detachment of an electroadhesive device.

Peeling moment 80 may cause the electroadhesive device 10 to detach, first partially, and then potentially fully from top to bottom. Partial detachment is shown in FIGS. 7D (top view) and 7E (side view), where 112 represents portions of the electroadhesive device 10 surface that are still attached to wall 14, while 114 represents a portion of wall surface 12 that has already peeled away. The length of peel line 110 is a measure of the force or torque that can be resisted by the electroadhesion without peeling.

Figure 7F:
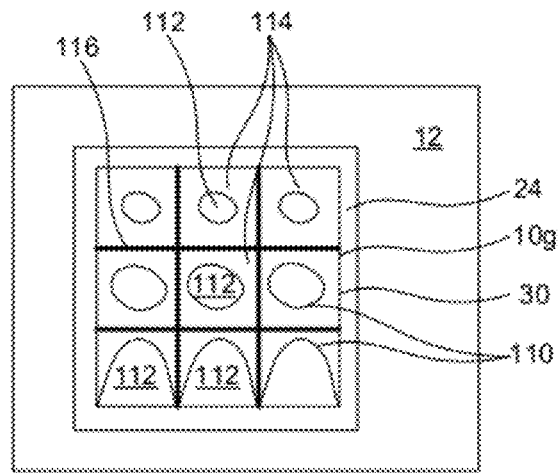
FIGS. 7F and 7G show an electroadhesive device that includes a grid structure to subdivide the overall electroadhesive device area in accordance with another embodiment of the present invention.
Figure 7E:
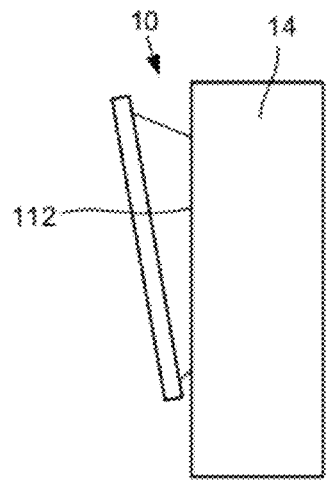
Figure 7G:
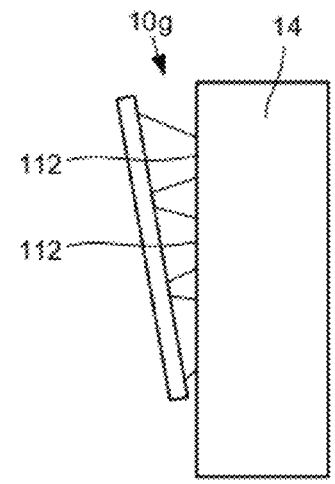

In one embodiment, an electroadhesive device 10 is adapted to increase peel-resistance. In a specific embodiment, electroadhesive devices 10 increase the cumulative length of the peel line 110, thereby increasing the peeling force to detach the device 10. For electroadhesive device 10g shown in FIGS. 7F and 7G, this solution is achieved using a grid structure 116 to subdivide the overall electroadhesive device area 30 (which consists of both attached areas 112 and detached areas 114; see FIG. 7F). Grid structure 116 increases the cumulative length of peel lines 110 for electroadhesive device 10 by separating the lines. While grid structure 116 provides a more peel-resistant electroadhesive device, the resulting increase in bending stiffness of device 10 may impede the ability of the electroadhesive device 10 to maintain intimate contact with wall surface 12 and thus may reduce clamping forces. Techniques to compensate and increase the clamping force were described above.

Figure 7H:
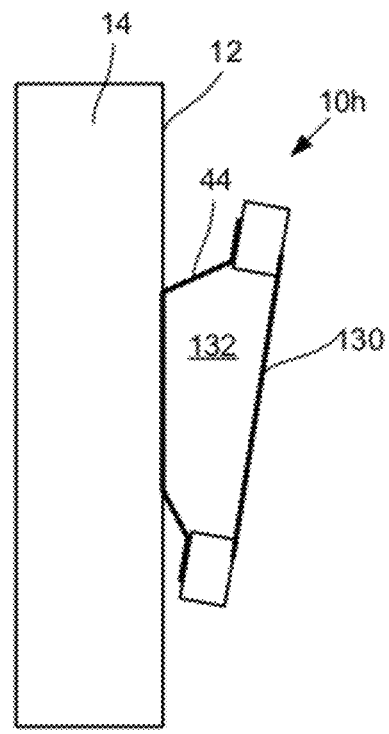
FIGS. 7H and 7I show a peel-resistant electroadhesive device in accordance with another embodiment of the present invention.
Figure 7I:
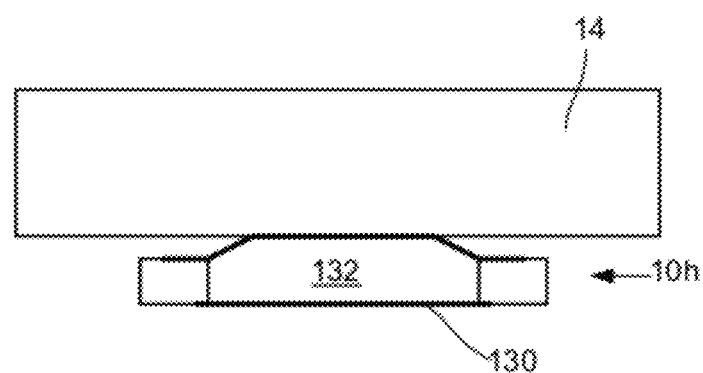

FIGS. 7H and 7I show a peel-resistant electroadhesive device 10h in accordance with another embodiment of the present invention. Electroadhesive device 10h includes a sealed plenum-like structure 130 that creates a relative vacuum pressure in a space 132 that is at least partially sealed by the surface of insulating layer 44 opposite to the adhering surface. The vacuum pressure in space 132 limits deformation of the compliant insulating layer 44. Although a sealed air chamber is shown in FIGS. 7H and 7I, similar peel resistance may be achieved using a soft elastomer, gel, or even liquid inside the cavity instead of air.

Functionally, once electroadhesive device 10h attaches to wall 14, peeling of the electroadhesive device 10h has to increase the volume of the sealed space 132. This decreases pressure in space 132, thus causing the vacuum pressure space 132 to resist further peeling. This passive structural modification has demonstrated an increase in peeling force of 2.6× and 1.8× for wall and ceiling electroadhesion forces, respectively.

Having discussed several simple electroadhesive devices, electrodes 18 and insulating material 20 will now be expanded upon.

Electrodes 18 include a conductive material that communicates electrical energy. Generally, electrodes suitable for use with the present invention may include any conductor, shape and material provided that they are able to supply and transmit an electrostatic adhesion voltage that induces an adhering electric field into a nearby wall or structure. The electrodes may be deposited on a surface of the electroadhesive device as a conductive coating, or embedded therein. Conductive coatings 18 or layers may include any suitable electrical carrier, such as a carbon impregnated polymers, a metallic spray or sputtered coating, or any other suitable conductor available to one of skill in the art. Electrode 18 may also be made up of an insulated or non-insulated electrical wire. Because electrostatic forces typically operate at high voltage and low current, the conductive material 18 need not be highly conductive. In fact, the natural conductivity of carbon fibers or other carbon particles, even diminished by mixing them into a non-conducting polymer matrix, is more than sufficient in many cases. Embedding the electrode 18 in insulating material 20 or under another material protects the electrodes.

The present invention may employ a wide variety of electrode 18 materials. In one embodiment, the electrodes 18 are rigid. Suitable materials for rigid electrodes 18 may include a metal such as copper, aluminum, gold, brass, and conductive polymers.

In some cases, "rigid" electrode materials may also be considered deformable if they are sufficiently thin. For example, aluminized mylar or gold-coated polyimide are both typically quite flexible and compliant because they can easily bend in thin shapes, though they are non-extensible (non-stretchable). Very thin metals and other conductors can also be advantageous because a local electrical breakdown can self-heal by locally vaporizing electrode material until the field can be supported again. This self-healing process makes the electroadhesion device 10 more robust. Related self-healing methods are known, for example, in the capacitor prior art as a way to make the device more robust. Another method to construct compliant electrodes out of "rigid" or non-extensible materials is to construct it with in-plane of out of plane corrugations (such as zigzags) that can be expanded without stretching the electrode. In another embodiment, electrodes 18 are compliant and change shape or extend with device 10. Suitable compliant, extensible electrodes materials include conductive greases such as carbon greases or silver greases, colloidal suspensions, high aspect ratio conductive materials such as carbon fibrils and carbon nanotubes, and mixtures of ionically conductive materials. Other suitable materials include graphite powders, carbon black, colloidal suspensions, silver filled and carbon filled gels and polymers, and ionically or electronically stretchable conductive polymers. In a specific embodiment, an electrode suitable for use with the present invention comprises gold-coated polyimide or kapton. Aluminized mylar can also be used as a lower cost alternative but is more prone to cracking and "open" circuits, particularly in the connection region. In another specific embodiment, stretchable electrodes can be made by mixing LSR 5810 silicone elastomer made by Nusil Technology of Carpenteria, Calif. with conductive carbon black (Vultan(R) XC72R) made by Cabot Corporation of Alpharetta, Ga. in a 5:1 ratio. Solvents such as naptha or hexane can be used to lower the viscosity of the electrode during mixing or deposition. Various types of electrodes suitable for use with the present invention are known in the prior art of complaint conductors and examples are described in commonly owned U.S. Pat. No. 7,034,432, which is incorporated by reference herein in its entirety for all purposes.

Carbon based electrodes may be patterned by spray deposition and screen printing for example. In a specific embodiment, a compliant electrode 18 includes a thin coating applied in a selective area or pattern to a surface of insulating material 20 (FIGS. 6A and 6B). For example, the compliant electrode may include a carbon-impregnated elastomer patterned with a stencil. The compliant electrode 18 adds little stiffness to a deformable electroadhesive device 10. In addition, the carbon-impregnated polymer adds little thickness to electroadhesive device 10. In one specific embodiment, the carbon-based electrodes can be deposited to form strands on the electroadhesive device 10 in the shape of cilia discussed in FIG. 6C. In another embodiment, an electrode can be patterned by removing material. For example, etching away or even peeling away certain areas of aluminum coating on an aluminized mylar sheet can result in a patterned electrode left behind on the mylar substrate.

Insulating material 20 includes any material that can separate charges from adjacent electrodes 18, substantially maintain the electrostatic adhesion voltage between the first electrode and the second electrode, or otherwise allows the power supply providing the electrostatic adhesion voltage to maintain the electrostatic adhesion voltage. In one embodiment, spacing between electrodes 18 determines the conductivity limit of insulating material 20; if the electrodes 18 are too close, even a good insulator may be weakly conductive at some high voltages that may be used in device 10. In some cases, air pockets may act as the effective insulation between electrodes 18 (see FIG. 4G or 5B for example).

In one embodiment, insulating material 20 includes a compliant material. In a specific embodiment, insulating material 20 includes an elastic modulus less than about 10 MPa. In another specific embodiment, insulating material 20 includes an elastic modulus less than about 1 MPa.

Insulating material 20 may also include more rigid materials. Some rigid materials may be thinly cast, such as mylar; this allows the thin material to be bendable and conformable but not substantially elastically extendable. In order to support larger loads, a stiffer stronger insulating material 20 may be used.

Specific examples of insulation material 20 may include a compliant rubber or elastomer, acrylic elastomers, mylar, polyimide, silicones, silicone rubbers, payralin, PMDS elastomer, silicone rubber films, polyeurethane, polypropelene, acrylics, nitrile, latex, fiberglass, fiberglass cloth, glass, and ceramic. One suitable insulation material 20 is silicone RTV 118 as provided by GE Silicones of Wilton, Conn. PVC films (popularly used as cling wrap for food packaging) are also suitable for use and have a good balance of elasticity, elastic modulus, and dielectric breakdown strength. Since these materials are made to have enhanced static electricity, they have low leakage rates and high dielectric breakdown strength. Breakdown tests on PVC films have indicated a breakdown strength of 250 to 550 V/micrometer, which is well above the minimum required for electroadhesion. Another suitable material is mylar, due to its excellent breakdown strength and low inherent leakage (and power consumption).

Electroadhesive device 10 may be packaged in a vast array of form factors, shapes, and sizes. Padded and flat electroadhesive devices 10 have already been illustrated. Electroadhesion tracks, suitable for ground-based locomotion, are shown below in FIGS. 10A-10C. Electroadhesive device tires are shown in FIGS. 11A and 11B. The ability to make the support structure 24 rigid or soft also permits custom shapes with varying surface textures. It is also important to note that electroadhesive device 10 is substantially scale invariant: electroadhesive device sizes may range from 1 square centimeter to several meters in surface area. Larger and smaller surface areas also possible, and may be sized to the needs of an application.

Electroadhesive device 10 can adhere to a wide variety of materials 16, structures 14 and surfaces 12. Sample surfaces 12 includes those found on: indoor and outdoor walls, rocks and trees and other obstacles found in natural environments, sloping structures such as bridge spans and sides of storage tanks, ceilings, and doors and windows. The indoor and outdoor walls may include vertical walls, angled walls, ceilings, and the like. Sample structures 14 include buildings and parts thereof, trees, cars, planes, boats, and other vehicles larger than the device or a robot that uses the device 10, bridges, storage tanks, and pipes.

Electroadhesion as described herein also provides robust attachment to a wide variety of wall materials including but not limited to: concrete, wood, glass, plastics, ceramic, granite, rocks, asphalt, and metals. For example, the present invention works with most wall materials such as concrete, wood, steel, glass, and drywall commonly found in everyday buildings. Non-perfect conditions and surfaces are also suitable for attachment, such as damp surfaces, dusty surfaces, and uneven and/or rough surfaces. Rough surfaces are suitable for use and were described above with respect to FIGS. 5A-5C.

Electrical Control and Circuits

Figure 8:
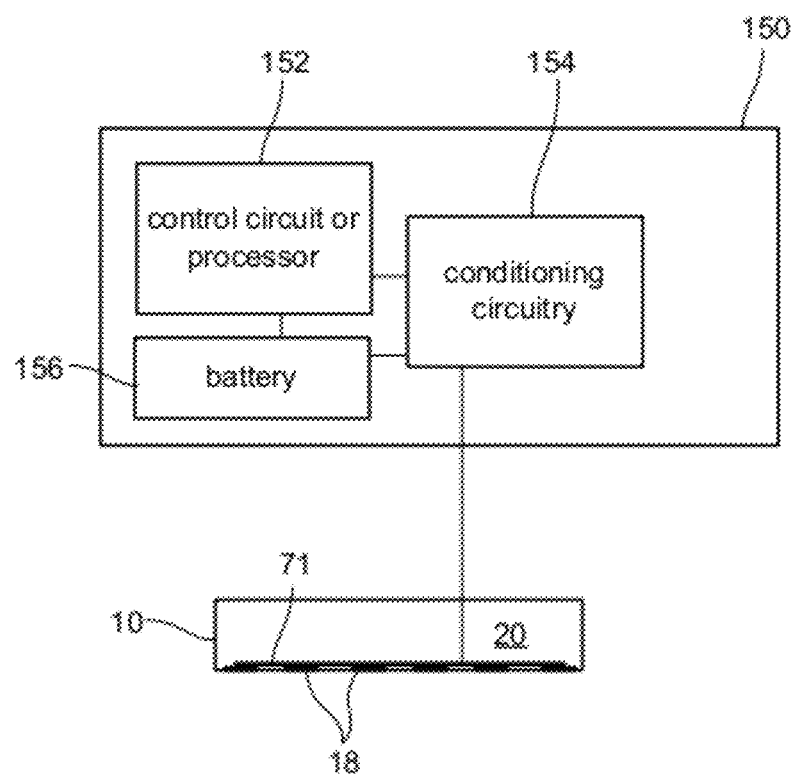
FIG. 8 shows control and conditioning circuitry suitable for providing a suitable electrostatic adhesion voltage to electrodes of an electroadhesive device in accordance with one embodiment of the present invention.

The electroadhesive devices typically rely on electrical control and input. For instance, at the very least, a minimum amount of circuitry is needed to provide electrostatic adhesion voltages to the electroadhesive device 10. FIG. 8 shows control and conditioning circuitry 150 suitable for providing a suitable electrostatic adhesion voltage to electrodes 18 of electroadhesive device 10 in accordance with one embodiment of the present invention.

Control circuitry 152 is configured to determine when a suitable electrostatic adhesion voltage is applied to electrodes 18. Circuitry 152 may include a processor or controller that provides on/off signals that determine when electrostatic adhesion voltages area applied, and what magnitudes. Circuitry 152 may also determine the times associated with a charge and discharge cycle on the electroadhesive device 10.

Conditioning circuitry 154 may include any circuitry configured to perform one or more of the following tasks: voltage step-up, which is used when applying a voltage to the electrodes 18, conversion between AC and DC power, voltage smoothing, and recovery of stored electrostatic energy. Conditioning circuitry 154 may be designed to receive power from a low-voltage battery 156. For example, in robotics applications, conditioning circuitry 154 may receive a voltage from a conventional battery, such as those less than 40 volts, and increase the voltage to an electrostatic adhesion voltages above 1 kilovolt. The low voltage power source such as the battery may be replaced by another electrical source such as a small photovoltaic panels similar to the ones used in many handheld calculators. In one embodiment, conditioning circuitry 154 includes a transformer configured to provide voltage step-up to electrostatic adhesion voltages described herein. In a specific embodiment, conditioning circuitry 154 includes a model No. Q50-5 as provided by EMCO High Voltage Corporation of 70 Forest Products Road, Sutter Creek Calif. Leads 158 extend from conditioning circuitry 154 to common electrode 71, which simultaneously communicates with electrodes 18 of electroadhesive device 10.

More complex charge control circuits may be developed, depending on the configuration of electroadhesive device 10, and are not limited to the design in FIG. 8. Also, some of the circuit functions may be integrated. For instance, one integrated circuit may perform the functions of both the step-up circuitry 154 and the charge control circuitry 152.

The voltages provided to electroadhesive device 10 may vary. In one embodiment, AC actuation is applied to the electrodes. In some cases, electrostatic forces on a dielectric substrate have been shown to relax over a time constant under steady DC actuation. This phenomena can also occur in insulator 20 if it traps charge. However, by alternating the polarity of charge on each of the compliant electrodes 18 at a high frequency, electroadhesive forces can be maintained or even enhanced. In a specific embodiment, the AC signal includes a frequency above 1 Hz. Other higher and lower frequencies may be used. In another embodiment, multiple sets of electrode 18 are used with applied AC voltages offset in time or shifted in phase. This allows one set of electrodes 18 to maintain electroadhesive forces while the AC voltage in another set temporarily passes through 0 voltage difference. In another embodiment, a DC actuation may be provided to the electrodes. In some of the cases with DC actuation, a moderately low insulator resistance may provide a leakage path to achieve a fast release when voltage is switched off. In other cases, a fixed amount of charge of opposite polarity to the DC actuation may be pulsed into the electrodes 18 to provide release when desired. In this case, the fixed amount of charge may come from an external capacitor or one that is a part of the conditioning circuitry 154 with a capacitance equal to that of the electroadhesive clamp 20.

Switching and response times of electroadhesive device 10 will then vary with the electrical equipment and signal applied to the electrodes 18. A 5 Hz signal, with a voltage rise time of one-tenth of the time period, provides a charge and discharge cycle of 20 milliseconds.

In general, electroadhesion requires a small amount of power to adhere to a substrate. The power requirement is small because electroadhesion may be primarily thought of as a capacitive device. This implies that with appropriate selection of insulation material 20 to minimize leakage currents (of the order of micro- or nano-amps in most cases), the reactive power remains small. Resistivity of insulator 20 may be reduced if trapped charge becomes a problem as long as the leakage current remains acceptable.

A quick power modeling of electroadhesion will now be provided to help assess power requirements in robotics and other applications. This is especially valuable in understanding the endurance of a robot when in a perch or hold position with no locomotion, where the robot still needs to stay attached to a wall or ceiling for extended periods of time.

As an illustrative example, an electroadhesive area of 15 square inches may support the weight of a 1.5 lb robot at an electroadhesion pressure of 0.1 psi (a conservative clamping pressure that accommodates wet and rough surfaces and the possible presence of particulates). This area may be decreased to 3 square inches for many designs. The electroded area can be roughly estimated at 50 percent of the overall area of the contacting surface 80 of device 10 (e.g., 1 millimeter wide electrodes with 1 millimeter spacing between them). Although the capacitance of the electroadhesion would depend on the substrate 16 to which the device 10 is being clamped, a simplifying estimate can be obtained by approximating the capacitance through the thickness of insulating material 20 when the substrate 20 is a conductive material such as steel. This estimate is a conservative one since the effective charge path for nonconductive substrates is greater and results in a lower capacitance.

The capacitance of a parallel plate capacitor is:

$$C = \epsilon_o \epsilon_r A/d \qquad \text{(Equation 2)}$$

where $\epsilon_r$ is the dielectric constant of the material of interest, $\epsilon_o$ the permittivity of free space, A is the electroded area on device 10, and d is the insulated electrical path length between the electrodes 18 (i.e. excluding the distance through the conductive substrate and other conductors). With an acrylic with a dielectric constant of 4.7 and a thickness of approximately 25 microns as insulating material 20, Equation 1 produces a capacitance of 0.8 nF for an area of 3 square inches (note that d is twice the acrylic thickness in this case).

The power required to charge and discharge this resistor is given by:

$$P = \frac{1}{2}CV^2 F\eta \qquad \text{(Equation 3)}$$

where V is the voltage to which the capacitance is charged (e.g., 3-4 kV), $\eta$ is the efficiency of the low-to-high voltage conversion, and F is the frequency of the charging and discharging. For wheeled robots as described below, the charging and discharging occurs as the wheel rotates, e.g., it uses a commutator design as described below. However, when the robot is stationary, the compliant electrodes may be charged with bipolar AC voltage in order to prevent buildup of charge in the substrate, which for some substrates may gradually decrease the clamping force. For purposes of illustration, assuming an AC charge/discharge frequency of 20 Hz and an efficiency of 50 percent, device 10 uses of 0.26 W of power.

In some cases, additional power may be required to overcome leakage resistance of the insulator material 20. Because the resistance between two successive electrodes 18 is fairly large (e.g., in the order of Gigaohms), the leakage currents involved are of the order of microamps or even nanoamps. As such, the $I^2R$ resistive losses are a small fraction of the power required to charge and discharge the effective capacitance between the compliant electrodes.

In a fully operational robot as described in the next section, most of the power for mobility is therefore for the drive motors and communication equipment, similar to that in a ground vehicle. It may also be noted that the above analysis assumes that the charge from each cycle is dissipated through a resistor or other means. With some additional circuitry that recovers charge and shuttles it across capacitors, the electronic efficiency may exceed 80 percent, which decreases the power required for clamp-on hold and increasing the endurance of the robot in a perch mode. It should also be noted that if AC charging and discharging is not needed, as is often the case, then much lower power is needed. For example, on many surfaces and electroadhesion device 10 configurations, DC voltages work well and the device 10 may be simply peeled off for removal rather than needing to turn off power. The peeling may be done manually or, on a robot, parts of electroadhesion device may be peeled off while other parts are attached (for example using electroadhesive wheels or treads; see later descriptions of robots). In such cases where DC power can be used, the power consumption can be dramatically reduced and in one embodiment it was estimated that only 100 microwatts of power would be needed to hold a 1 lb. (0.45 kg) robot on a wall.

Figure 9:
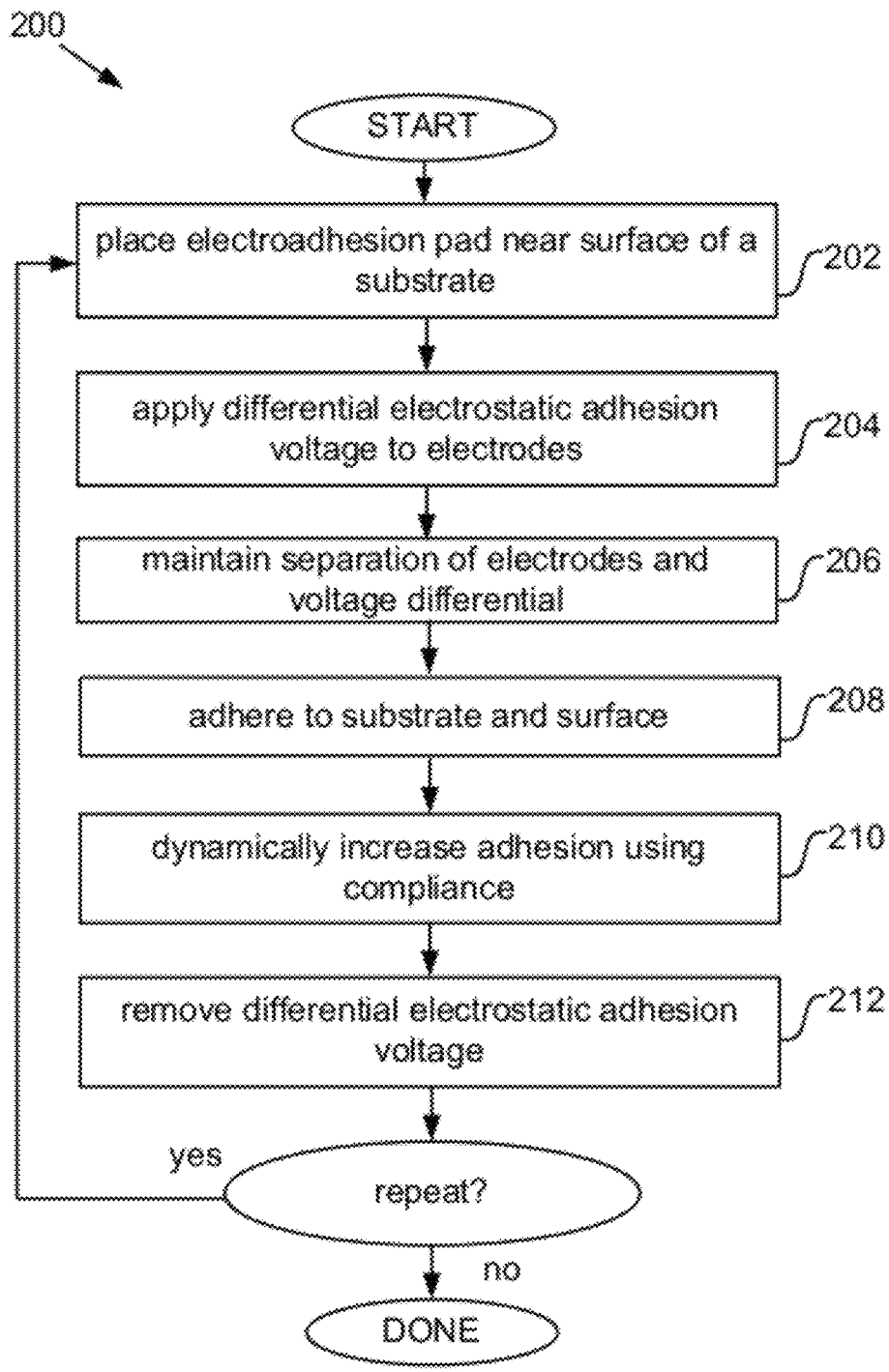
FIG. 9 shows a method of adhering objects using electroadhesion in accordance with one embodiment of the present invention.

FIG. 9 shows a method 200 of adhering objects using electroadhesion in accordance with one embodiment of the present invention.

Method 200 typically begins by positioning an electroadhesion device in proximity to a surface of a substrate (202). As mentioned below with respect to the robots, this may be automated using mechanical means such as a wheel or track. A user may also do so manually in the case of the double-sided electroadhesive device 600 of FIG. 16A.

Control circuitry in electrical communication with electrodes in the electroadhesion device then applies a differential electrostatic adhesion voltage to the electrodes (204). In some cases, the steps 202 and 204 may be reversed, i.e. the voltage to the electrodes may be first applied before positioning the electroadhesion pad near the substrate. The voltage difference may be applied substantially simultaneously, or at different times. Suitable electrostatic adhesion voltages—to create an adhering electric field and electrostatic force between the electroadhesion device and substrate—were described above.

Insulation material 20 maintains separation of the electrodes and maintains the voltage differential for electrostatic adhesion (206). This maintains the adhering electric field and electrostatic force between the electroadhesion device and substrate.

The device then adheres to the substrate (208). In another embodiment, the electrostatic forces are used to increase traction of the electroadhesive device relative to a surface. Enhanced traction is useful for mobility (of robots or other devices) on inclines or low slippery surfaces such as ice for example.

In one embodiment when the electroadhesion device includes a deformable material between the electrodes and at the surface of the substrate, the compliance permits the electrodes to move closer to the surface and this dynamically increase the electrostatic force and adhesion strength (210). This is shown and explained above with respect to FIGS. 5A-5C.

When it is desirous to cease the electrostatic adhesion—to move the electroadhesion device relative to the wall for example—the control circuitry then removes differential electrostatic adhesion voltage (212). If the electroadhesion device is to be moved to another location, method 200 may repeat as desired. In other cases, the electroadhesive voltage may be always on and the robot moved by mechanically peeling away the electroadhesive device from the surface without turning the voltage off.

Devices and Applications

Electrically controlled adhesion finds wide use in a wide variety of devices and applications. For example, many devices designed or adapted for wall crawling are well suited to use electroadhesive devices and methods described herein. Some examples described in further detail below include wall crawling robots, electroadhesion equipment worn by a person for wall crawling, and electroadhesion ladders that allow the topside or the entire length of a ladder to adhere to a wall so that a person may climb the ladder. Many other devices may use the electroadhesive devices and methods as described herein.

Many devices in this section, such as the robots, permit robust performance. They are able to: clamp and unclamp with electroadhesion speeds of response less than 1 second, conform around and clamp to rough surfaces, operate in dusty or damp environments, transition across orthogonal surfaces on walls, etc. In addition, the electroadhesive devices add little weight; many standalone pads may weigh less than an ounce.

Figure 11A:
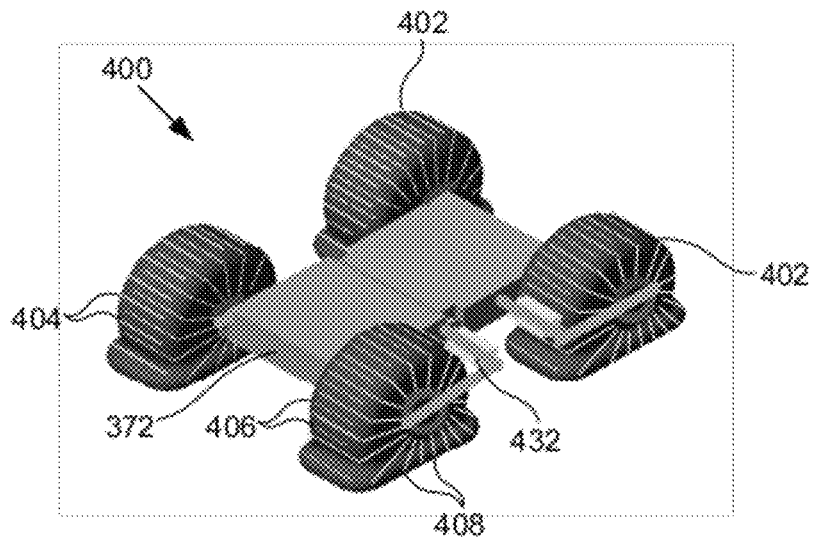
FIG. 11A illustrates a wall-crawling robot that uses electroadhesion in accordance with another specific embodiment of the present invention.
Figure 11B:
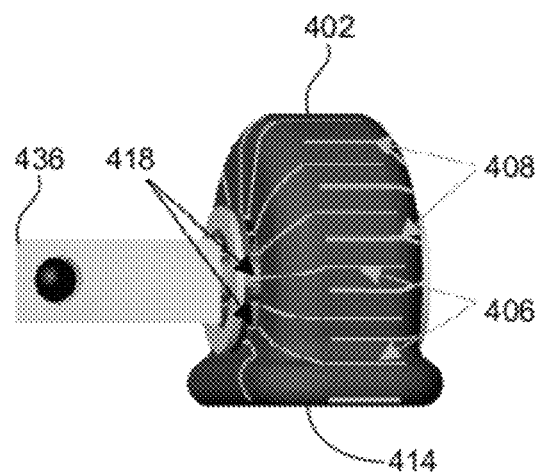
FIG. 11B shows a perspective view of the tire for the robot of FIG. 11A in closer detail.
Figure 12:
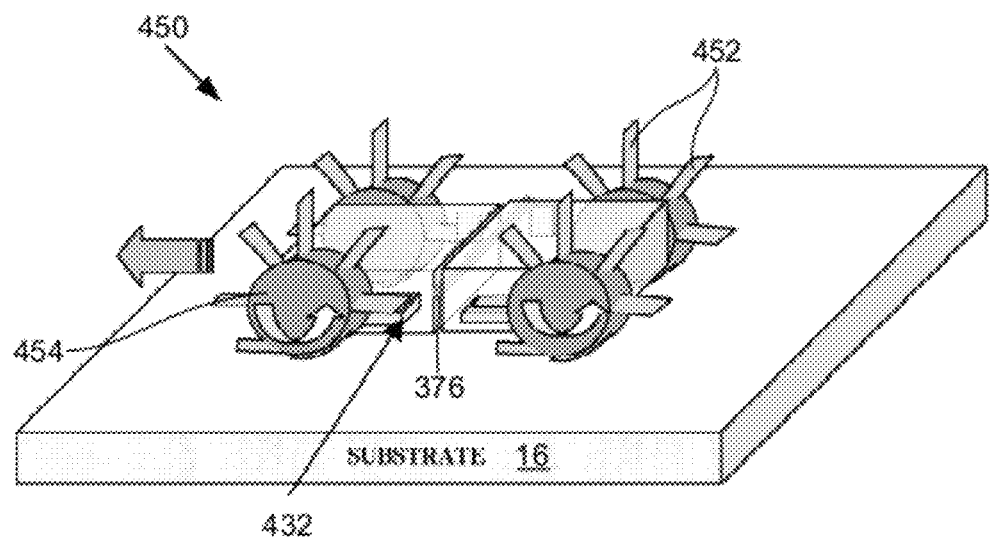
FIG. 12 shows a robot in accordance with another specific embodiment of the present invention.

Numerous robot illustrative designs will now be discussed. In one embodiment, electroadhesion is used to enable a wall-crawling robot. This may include adding electroadhesive devices to rotary locomotive robots, such as those using wheels or tracks (FIGS. 10-12).

Figure 10A:
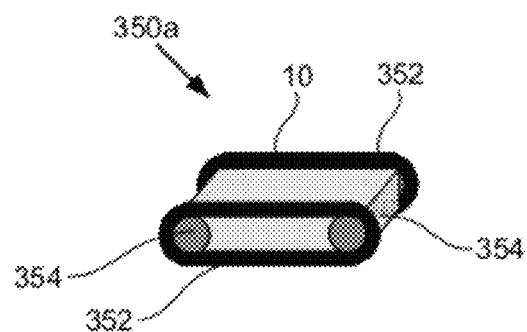
FIGS. 10A-10B shows a tracked wall-crawling robot modified with electroadhesive devices in accordance with a specific embodiment of the present invention.

FIG. 10A shows a wall-crawling robot 350a in accordance with a specific embodiment of the present invention. Robot 350a includes two tracks 352 on left and right sides of a chassis 354. In some cases, a single continuous electroadhesive device may be employed that attaches to both left and right side of chassis 354 (similar to a conveyor belt).

Chassis 354 provides structural support between wheels 354, which interface with track or tracks 352. Chassis also includes all portable locomotion requirements for robot 350, such as a battery or other power source, one or more motors to turn wheels 354, wireless communication equipment and interfaces, payload such as a camera, etc.

Tracks 352 include one or more compliant electroadhesive devices on their outer surface. In one embodiment, the electroadhesive devices continuously follow along the track length without interruption. Both the mechanical structure of tracks 352 and compliant electroadhesive devices disposed thereon can conform around rough or uneven surfaces. Tracks 352 offer a large electroadhesive surface area, without requiring an appreciable mass. In addition, the tracks offer a reliable, robust, and proven way for locomotion on unstructured and unpredictable terrain—both flat and vertical.

To turn, one or both tracks 352 slide relative to a surface. During turning, electroadhesion between one or both tracks 352 and the surface may be reduced. In addition, control of the electroadhesion pressures on individual tracks 352 can be used to steer the vehicle without any additional mechanisms, thereby providing a simple and lightweight steering mechanism. In other cases, the speed of track 352 may be changed on one side of the robot relative to the other.

Figure 10B:
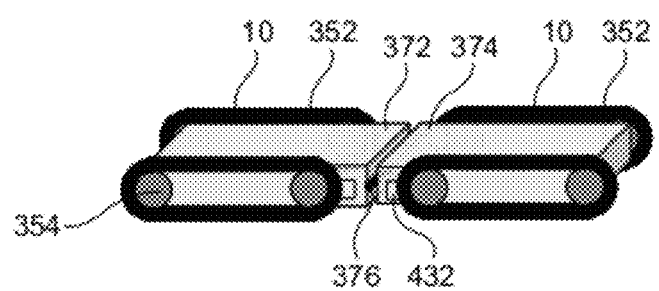
Figure 10C:
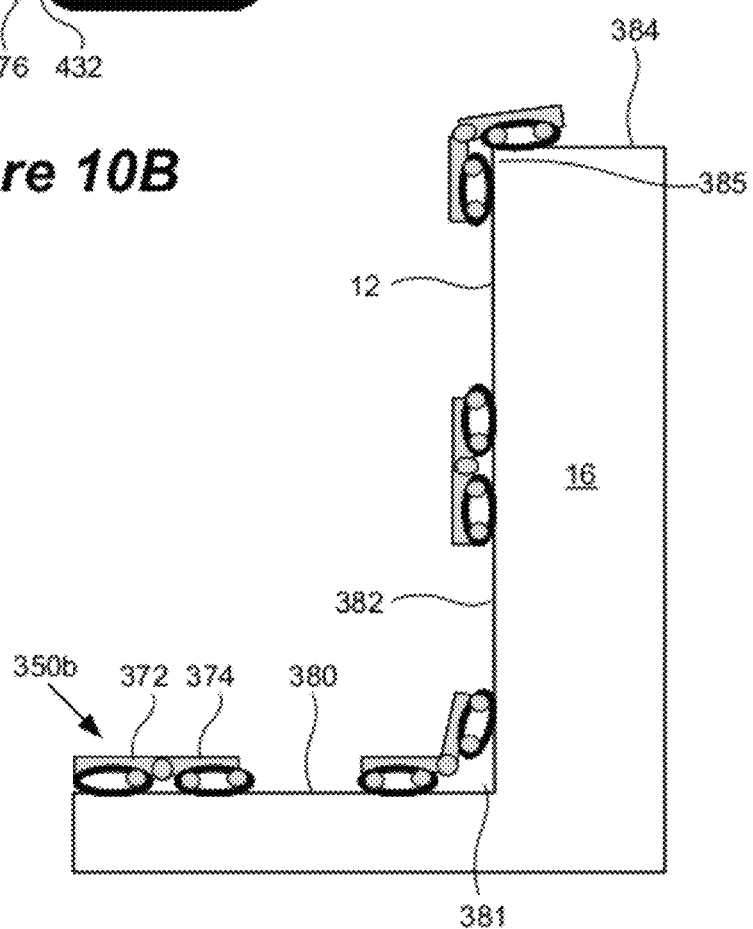
FIG. 10C shows the wall-crawling robot of FIG. 10B moving from a horizontal surface to a vertical wall and to another horizontal surface.

FIG. 10B shows a wall-crawling robot 350b in accordance with another specific embodiment of the present invention. Robot 350b includes multiple segments 372 and 374 and a hinge 376 that permits pivoting between segments 372 and 374. As will be described below, this facilitates transitioning between horizontal surfaces (floors and ceilings) and vertical surfaces (walls). FIG. 10C shows wall-crawling robot 350b traversing from a horizontal surface 380 to a vertical wall 382 and to another horizontal surface 384.

Referring to FIG. 10B, segments 372 and 374 are each capable of pivoting relative to the other, about hinge 376, while each capable of independently maintaining adhesion to a wall surface. This allows wall-crawling robot 350 to successfully negotiate the inner and outer corners of a building, for example. Although not shown, robot 350 may include more than two segments, such as three, four, ten, or more.

Hinge 376 attaches to segments 372 and 374 and permits rotational motion between segments 372 and 374. Hinge 376 may be passive or articulated. An articulated hinge 376 uses an actuator to controllably rotate the hinge and move one segment relative to the other. For example, the actuator may include a lead screw-motor device, or a motor with a gearbox, in order to provide torque. The articulation may actuate for 90 degrees, or greater, of rotation in either direction in order to negotiate orthogonal surfaces. A passive hinge 376 reacts to the forces applied to it by segments 372 and 374.

As shown in FIG. 10C, for an inner corner 381 (e.g., floor 380 to a vertical wall 382), the forward (upper) segment 374 raises and folds upwards while the trailing (lower) segment 372 provides traction and electroadhesion until the top segment 374 clamps to the vertical surface 12. Although not shown, wall-crawling robots 350 may be capable of movement in both forward and reverse directions (e.g., by reversing the direction of wheels). In this case, segment 372 becomes the forward segment while segment 374 becomes the trailing segment 372.

For an outer corner 385 (where vertical wall 382 meets top surface, or roof, 384), the forward segment 374 first comes into contact with roof 384, which is about orthogonal to vertical wall 382, and then drags the rest of the robot 350 with it. Once transition of one-half of robot 350 has been achieved, adhesion of trailing segment 372 can be switched off, temporarily making the robot 350 a front-wheel drive vehicle until the rear tracks gain adhesion to the roof 384 surface. This results in the ability to easily transition across orthogonal surfaces and reduces power consumption.

In one specific embodiment, some of the wheels 354 are passive and do not provide rotational power. In another specific embodiment, some of the wheels 354 are spring loaded and can move slightly to maintain and increase the amount of contact with the wall as the robot turns upwards.

As mentioned above with respect to FIGS. 7A-7I, electroadhesive devices may be adapted to resist peeling. Peeling also concerns a robot when the robot exerts torques on its electroadhesive devices because its center of gravity is distant from a wall surface.

One technique to reduce peeling torques for a robot is to make the robot as thin and flat as possible. Robot 350 also exerts a clamping force normal to wall 14 so that the robot does not peel off the wall. As a simplified example, a low-profile robot weighing 5 N (about 0.5 kg or 1 lb mass) might have a center of mass located 0.075 m (about 3 inches) from the wall surface 12. In this case, the peeling torque exerted is 5 N×0.075 m, or about 0.375 N-m (about 3 in-lbs). For a 0.25 m (10 inch) long robot that pivots at the bottom and has an electroadhesive clamping force distributed roughly uniformly along its length so that the average moment arm is roughly 0.125 m (5 inch) from the bottom, the normal clamping force needed is about 0.375 N-m/0.125 m=3 N. Assuming a modest clamping pressure of 1.5 kPa (about 0.2 psi), the required 3 N clamping force can be achieved with an electroadhesive device of 3 N/(1500 Pa)=0.002 $m^2$ or about 3.1 square inches in size for most electroadhesion materials on a variety of wall surfaces. In general, rougher surfaces will require greater clamping pressures or larger electroadhesive device to make the robot even more robust.

Another technique to reduce peeling uses a double tracked robot 350b as shown in FIG. 10B. Robot 350b includes two tracked segments: a front segment 374 and a rear segment 372. In one embodiment, the front segment 374 is smaller than the passive rear segment 372 and pushed forward by the rear segment. In this case, rear segment 372 includes the motors and gearing to move robot 350b.

For a robot climbing up a vertical wall (see FIG. 10C), the peeling moment due to the center of gravity offset typically tries to rotate the robot about its lowermost point. The front segment 374 provides a force and moment that counteracts this peeling moment on the rear segment 372. Ribs, or rigid cross members, may also be added onto the track 354 of either segment to effectively segment the electroadhesive devices along the track 354 and interrupt full peeling. A mechanical extension or "tail" can also be added to many robots using electroadhesion. The tail forces the rotation point lower, thus increasing the effectiveness of electroadhesion to resist peeling torque by increasing the moment arm.

FIG. 11 illustrates a wall-crawling robot 400 using electroadhesion in a flattened tire configuration in accordance with another specific embodiment of the present invention. For sake of brevity, only the features of robot 400 not included in device 350 will now be described. Thus, components such as the chassis 372 and batteries are not detailed.

Robot 400 includes compliant and elastic electroadhesive devices 10 disposed on the outer surface, and around the circumference, of four under-inflated tires 402. Each tire 402 resembles a deflated tire in order to increase contact area between the electroadhesive device 10 disposed thereon and a surface to be adhered to.

Each tire 402 includes two sets of compliant electrodes 404: compliant electrodes 404 in an inner electrode set 406, and compliant electrodes 404 in an outer electrode set 408. The electrode sets 406 and 408 each include finger electrodes 404 that extend substantially across the tire 402 width, and are circumferentially offset from each other.

In one embodiment, an insulating and compliant layer (comprising a compliant material and not shown in FIG. 11A) separates the electrode sets 406 and 408. In a specific embodiment, the insulating layer includes an insulating elastomer layer. The electrode sets 406 and 408 are disposed on opposite sides of the insulating layer to prevent electrical breakdown across a gap between the electrodes 406 and 408. In another embodiment, the electrodes 406 and 408 may be located on the same side of a compliant substrate. This side may be either on the inside of a thin insulating layer, or on the outside of such a layer in direct contact with the substrate.

Both electrode sets 406 and 408 are also embedded in tire 402 under an outer layer (again, transparent and not shown in FIG. 11A so the electrodes can be seen, although the actual outer layer need not be transparent). The inter-electrode insulating layer and outer layer are usually thin so that the electrodes 406 and 408 remain close to the tire surface.

In operation, the flattened tires 402 increase the amount of surface area contact between the electrodes and a surface 12. As described above with respect to the method of FIGS. 5A-5C, the compliance of tire 402 and electroadhesive device 10 disposed thereon also permits dynamic increases in the surface area contact to provide greater surface area attachment and higher adhesion forces. In some cases, it may not be necessary to flatten the tire if the electroadhesive force from an inflated tire is sufficient to support wall climbing. In such cases, the power required to drive the robot forward may be lower than in the case of using a flattened tire.

Electrically, activation of compliant electrodes 404 near the substrate surface may use bipolar AC voltages to achieve both robust clamping and fast declamping (so as to not retard the motion of the vehicle). The AC voltages are also useful when the robot is stationary in order to avoid deterioration of clamping force over time because of trapped charge in the substrate or insulator. Deactivation of the electrodes permits the removal of dust, moisture, or other substances that may adhere to the wheel 402 (or track) during normal operation and reduce adhesive efficiency. Thus, by switching off the electroadhesion away from the clamping surface, dust particles no longer actively adhere to the wheels 402 (or tracks 354 of robot 350), and as described in further detail below, permit a simple passive cleaning device such as a brush 432 to remove any additional debris on the wheel or track. In some cases DC voltages are satisfactory in maintaining adequate electroadhesive forces as noted earlier. Brushes may still be helpful in DC operation by sweeping the electroadhesive surfaces that adhere to the substrate clean. In the DC mode the dust and debris may accumulate at the brush location until it can fall off away from the critical surfaces.

In an AC mode, in order to achieve transfer of charge to and from the compliant electrodes at select times in the tire 402 rotation, an electrical commutator may be used. The commutator is configured to apply charge to the electrodes 404 during a bottom angle of the rotating wheel 402 when the tire is in contact with surface 12 (or just before), and removes this charge from a top or side angle of rotation that is not in contact with the substrate to aid cleaning. The commutator thus allows selective rotational electroadhesion and activation of the electroadhesive devices by regulating when electrical energy supplied to the electrode sets 406 and 408. The commutator is relatively simple and permits the application of bipolar AC signals to the appropriate portions of wheel rotation, and removal of charge from other portions of the wheel rotation without requiring numerous signals. Many commutators suitable for use herein are commercially available from a wide variety of vendors. The commutator may send high voltage on or off the electroadhesive device directly if it has suitable high voltage capability. Alternately, a commutator can send low voltage power to small voltage converters inside the tire, or to high voltage switches such as solid state high voltage switches on the tire that switch a single source of high voltage to the correct electrodes. Alternatively to a commutator, a slip ring or other mechanism for selective rotational electrical actuation may be used, possibly in conjunction with increased insulation or lower number of effective channels to accommodate high voltages. One slip ring suitable for use is a model AC 246 from Moog Corporation of Blacksburg, Va. Note that the commutator or other mechanism for controlled rotational electrical provision may be used in other robots described herein (i.e., with tracks or flapped tires) with only minor modifications.

Other techniques to provide power to the electrodes are suitable for use. Alternatively, without brushes, a voltage bus may be fixed relative to the body 372 of robot 400 to contact spokes 418 at desired rotational locations to actuate the electroadhesive devices at desired angles. In another specific embodiment, a robot may use a high-voltage slip-ring, with four to eight channels, to provide signals to the rotating electroadhesive surfaces. Each sector of the wheel or track connects to one channel of the slip ring and activate when that sector is close to the substrate surface. In this case, a trigger sensor—that determines the position of each sector relative to the wall or ground—may be used to command input voltages.

Robot 400 permits easy steering. Indeed, off-the-shelf robots with modified wheels (to add flattened tires 402 and a commutator, for example) can be used for robot 400. Further, with independent axles 436 for each wheel, minimal sliding is necessary in order to achieve turning, allowing the application of full electroadhesive clamping force at all times, if desired. Alterations to robot 400 are contemplated. Other suitable configurations involve similar electroadhesive devices 10 integrated into rigid wheels of a robot.

Robot 400 also includes an optional cleaning system configured to clean electroadhesive devices 10 and surfaces of tires 402. The cleaning system may remove moisture, dust and other foreign particles that may rest between the pads and a wall surface. The cleaning system may be added to the other robots described herein. For example, cleaning system may be added to robot 350 to remove particulates and moisture from tracks 352.

The cleaning system components may vary with the objects removed from the adhesive pads. For example, the cleaning system may include a brush 432 (see FIG. 11B or 10A) that contacts the electroadhesive devices on tires 402 as they rotate to a position where they usually do not contact a wall. The brush 432 removes particulates very well. Alternatively, the cleaning system may include a foam material that removes both dust particulates and moisture from the electroadhesive devices of tires 402 or tracks 352 at one of their respective non-adherence positions. Other substances that may be removed include oils, dirt, grass, and other debris.

In one embodiment, the cleaning system is disposed on a path of moving electroadhesive devices 10 that does not interfere with where the pads 10 clamp to a wall for that robot. Robot 400 uses a side position (not bottom or top) along the rotational path of the tires 402 and permits the electroadhesive devices 10 to interface with the brush 432, which provides a simple and passive cleaning system that continuously cleans surfaces of each tire 402. Typically, the adhesion is turned off (e.g., using the commutator) when the wheel or track comes in contact with the cleaning pad, allowing for debris and liquids to be removed. Since the pressure that needs to be applied to clean a non-adhesive device is small, the cleaning system adds little added power to achieve sustained cleaning of the pads.

FIG. 12 shows a wall crawling robot 450 in accordance with another specific embodiment of the present invention. Robot 450 includes flexible electroadhesive devices 452 that extend radially outward from wheels 454.

Each electroadhesive device 452 is relatively planar, and includes a first end that attaches to wheel 454 and a second free end. Structurally, each device 452 resembles a flap. As each wheel 454 rotates, the electroadhesive devices 452 on each wheel rotate about the wheel axis and eventually: a) comes into contact with a surface of substrate 16, and b) flatten beneath the wheel 454. In both positions, electroadhesive device 452 provides an adherence force to substrate 16. Cumulatively, multiple electroadhesive devices 452 contacting the surface of substrate 16 provide a force sufficient to hold robot 450 aloft on vertical walls, angled walls, ceilings, and the like. In one embodiment, electroadhesive devices 452 each include a flexible material as the insulating material 20, such as rubber, which allows the device to readily deform.

Flap electroadhesive devices 452 may also be added to tracks 352 of robot 350 described above. In this case, one end of a bendable but not substantially extendable flap 452 attaches to the track 352 while the other is free to deform relative to the attached end. As each track 352 rotates, the flap electroadhesive devices 452 on each track eventually: a) come into contact with a surface of substrate 16, and b) flatten beneath the track 352 while the flap remains on the bottom side of the track attached to the wall. This design increases the amount of time that flap electroadhesive devices 452 contacts the wall, and increases electroadhesive contact area between robot and wall. In addition, flaps 452 incorporate increased peel resistance, since the load to support and drive the robot is applied to the bottom of each flap and is substantially in a direction that is in the plane of the flaps. The flaps 452 may also use the increased contact time, while under the track, to dynamically increase contact as described in FIGS. 5B and 5C. Such robots have been built, can scale vertical walls of many materials, and reach speeds of about 1 foot per second.

As shown, robot 450 also includes a hinge 376 and two segments attached thereto. Another embodiment of robot 450 includes a single segment, similar to the chassis of FIG. 10A or 11A. Turning robot 450 uses reduced sliding of pads 452, similar to the flattened tire design of FIG. 11A. In other cases, two side-by-side units with an articulated hinge between them can be used to achieve turning without the need to slide relative to the surfaces. Although not shown, hinge 376 and multiple segments 372 and 374 may also work with the wheeled designs of FIGS. 11A and 12.

The robots described above are able to robustly climb a variety of external surfaces including rough, dusty, and sometimes damp environments, move on interior surfaces, transition between orthogonal and other angled surfaces while maintaining adhesion to at least one surface, and remain motionless for substantial periods of time on a vertical wall or ceiling (also known as 'perching'). Prior to the electroadhesive-based robots described above, robots capable of all these functions did not exist despite having been investigated for many years, which hints at the breakthrough by controllable electroadhesion for wall crawling.

The robots described herein are well suited for a variety of tasks, and may carry payloads according to those tasks. For example, the robots may carry a camera for surveillance in dangerous or remote areas. Other payloads may be carried. Communications equipment, such as communications equipment to relay images captured by the camera and/or communications equipment to permit remote control, are also useful and may be carted by the robot. Such reconnaissance robots are useful for traversing complex and unstructured terrain, such as random buildings, especially in urban environments for a variety of scouting and other military or police missions.

There is a need in police and fire departments, the military, and industry for a portable robot device that can be sent into an inaccessible and/or hostile environment. The robots described herein are able to do so and traverse in three dimensions on the ground, walls, and ceilings on commonly encountered building substrates, readily transitioning across the surfaces when necessary. The ability to perch for long periods of time (more than 60 hours) on a wall or ceiling or navigate continuously for 3 hours in three dimensions without requiring battery charging is also useful in many of these applications. The ability to carry a communications link, which permits a user interface to control the robot, also extends usage in hostile environments.

Recent military operations in the Middle East and elsewhere have demonstrated the need for effective tools in urban combat operations. One such tool is a robot that has three-dimensional mobility. By affording access in a vertical direction in an urban environment, such a robot can enhance limited communications range at ground level by deploying communication antennae at much higher levels. Alternately, a robot may carry a surveillance camera and enter a building through a door, window, or hole in the building and scale the interior walls or ceilings of a room—before military personnel enter blindly. These smaller wall-climbing robots can also be deployed by soldiers into an urban combat zone inside a building by releasing them on the ground and steering them in. These robots may then scale walls surreptitiously and provide visual cues to the soldier from internal vantage points.

Another common feature permissible in the robots described above is symmetry along three axes (forward and back, left and right as well as top and bottom). The symmetry allows a robot to work from any position—regardless of orientation. The upside down symmetry allows the robot to detach from a ceiling and land on a floor, e.g., for rapid repositioning when necessary. In such situations, in addition to having good shock tolerance, the robot is then able to operate in whatever orientation in which it lands so that no power or time is wasted on trying to change its orientation. In addition, having cameras both fore and aft allows a teleoperator to see what is going on beneath a climbing robot, or optimize its perching position for maximum clamping capability and field of view.

The robots are also surprisingly fast. Many of the wall-crawling robot embodiments described above may operate with speeds of about 0.2 to about 1 foot per second—while climbing a wall. Faster and slower speeds are also permissible. Since the electroadhesion can be switched off when the robot is moving horizontally on the ground or another level surface, the electroadhesive devices would not add any additional friction to the robot under normal operation (where electroadhesion is not needed for locomotion) and affect ground speeds significantly.

In one embodiment, many of the robots described above and suitable for use herein are attained with slight modifications to commercially available robots, or using parts from commercially available robotic kits. For example, tracked robot 400 may include a tracked vehicle modified from a Tamiya Tracked Vehicle Chassis Kit Skill Level I model no. 3081246 as provided by Edmunds Scientific of Tonawanda, N.Y. Commercially available robotic components, most of which are already designed for lightweight robots, suitable for use may include motors, speed controllers, battery packs, solar panels, micro receivers or other transmitters, and/or camera units with transmitters. One suitable motor includes a Copal 60:1 gear motor model no. 0-copal 60 as provided by The Robot Marketplace of Bradenton, Fla. This motor already comes with an inbuilt 60:1 gear train ratio. One suitable speed controller includes an Ant 150 Dual 5A high speed controller as provided by The Robot Marketplace (part number LB-ANT150-2). One suitable battery includes an Apogee 2480 mAh LiPoly rechargeable battery as provided by RC Hobbies and More of Winsted Conn.

The weight of a wall-crawling robot is important because clamping areas and power consumption to climb a vertical or other wall via electroadhesion increases with robot weight. Fortunately, many of the parts listed above are intended for portable robotics and already reasonably light; the electroadhesion parts also add little weight.

The electroadhesion also adds minimal power requirements to the portable robot, which must usually rely on batteries or some other form of portable energy. For example, the Copal motor operates at 6 V and a rated current of 400 milli-Amps. Integrating four such motors in order to independently drive the wheels of a robot described above provides a maximum power consumption of 9.6 W. Intermittent power may also be used to actuate an articulated hinge 376, if included. As discussed in the preceding section on power requirements for electroadhesion, the power draw for the wall climbing (around 0.3 W in some instances) represents only a small increase in total vehicle power The minimal addition to power draw also results in a small decrease in overall endurance. Endurance for a robot will depend on its power consumption, weight and power supply, among other factors. Many commercially available lightweight robots weigh less than 1 kilogram and have typical sizes of about 10 in×10 in and wheel diameters of about 4 to 5 inches or track dimensions of about 8 in×2 in. Their endurance will depend on the battery pack energy capacity that comes with the kit, which may provide an endurance of over two hours in many instances, and can be increased with added battery capacity. One robot that has been modified with electroadhesion tracks in a Tamiya Tracked Vehicle Chassis Kit Skill Level I model no. 3081246 as provided by Edmunds Scientific of Tonawanda, N.Y. Modifying these robots with oversized lightweight electroadhesive wheels or tracks enables mobile robots with little cost.

In other instances, the robots are custom built to fully leverage the advantages of electroadhesion. In a specific embodiment, a robot body includes a lightweight carbon fiber that provides a high strength-to-weight ratio.

Figure 13:
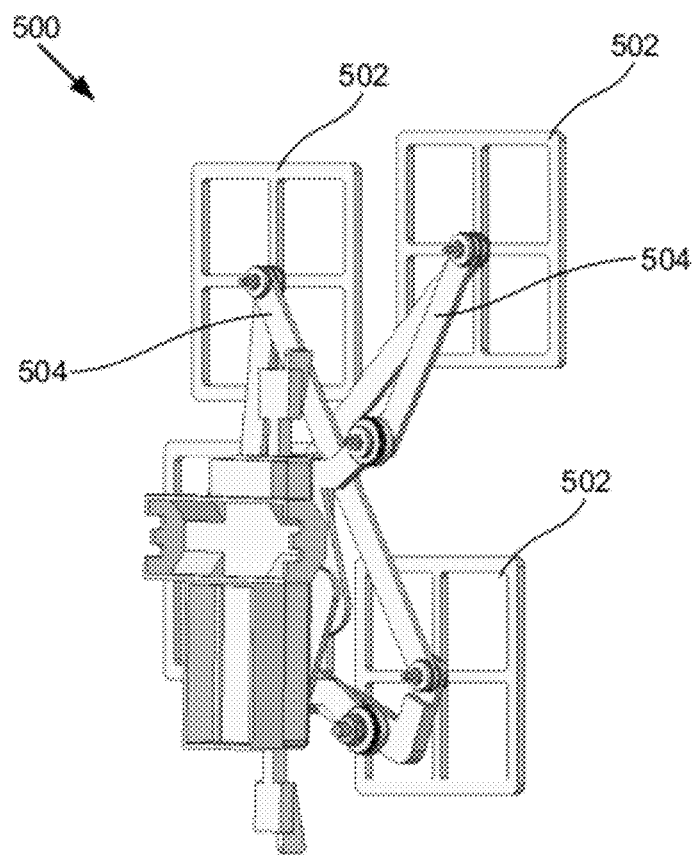
FIG. 13 shows a robot in accordance with another embodiment of the present invention.

Other robotic designs are contemplated and permissible. FIG. 13 shows a robot 500 in accordance with another embodiment of the present invention. Robot 500 uses flat electroadhesive devices 502 (the pads are shown similar to the grid electroadhesive design of FIG. 7F), each connected to a motorized wheel or tread using a 4-bar linkage 504. In one embodiment shown in FIG. 13, when the wheel rotates, the pads 502 move away from the robot but remain in an approximately constant orientation parallel to the wall. In another embodiment, the rotation of the wheel can produce a combination of an out of plane motion (to move the pads away from the wall) as well as in plane motion (to advance the pads while it is away from the wall). In some of these cases involving mechanically moving the pads away from the wall, it may not be necessary to switch off the electroadhesion during the robot motion. Using either of these embodiments, the power for electroadhesive device 502 can be located on the device itself, and does not require transfer of charge between a rotating frame and fixed frame. The switching of the electroadhesion can be synchronized to the rotation of the wheel thus simplifying the electronics requirements. More complex robots with articulated arms having multiple degrees of freedom may also include electroadhesive devices 502 distally attached to their distal end.

In a specific embodiment, a robot with electroadhesive devices 'walks'. These robots have electroadhesive devices that provide controlled on/off clamping and traction when the device touches a wall surface. In another specific embodiment, pads 502 are 'always on'. In this configuration, the electroadhesive devices 502 provide a normal force between the robot and the wall at all times. Robot 500 includes motors that overcome the friction from the adhesion of pads 502 and either drag the pads along the wall (e.g., a vertical wall) or peels them off as the robot moves. This scheme is simple and allows the clamps to operate continuously.

A walking robot using electroadhesive to assist locomotion may use a commercially available walking robot with minor modifications. This may include adding electroadhesive devices to the legs of a crawling robot, and providing a means of sequencing the electroadhesive actuation in coordination with the leg motions. Examples of such commercially available robots include robots made to climb walls using suction cups such as in the Climb@tron series of robots as provided by Edmunds Scientific of Tonawanda, N.Y. In many such cases, a direct replacement of the suction cups with electroadhesive pads can result in more robust wall climbing across a wider variety of substrates. Although off-the-shelf crawling vehicles are generally slow, the ease with which electroadhesive devices can be added makes them attractive. A power supply and control electronics for the electroadhesive devices may also be added onboard the robot, but as mentioned above, the electroadhesive devices consume significantly less power than locomotion for the robot, and the control electronics can also be negligibly small and light.

Other robots and robotic design may employ one or more electroadhesive devices as described herein. One alternative to wheeled or tracked locomotion is an inchworm-type robot. This robot uses a separate actuator to move electroadhesive devices relative to each other along a wall; the electroadhesive devices take turns clamping to permit the other end of the inchworm-type robot to move. Wall-climbing robots involving such actuators are known in the art, without electroadhesive devices that is.

Figure 14:
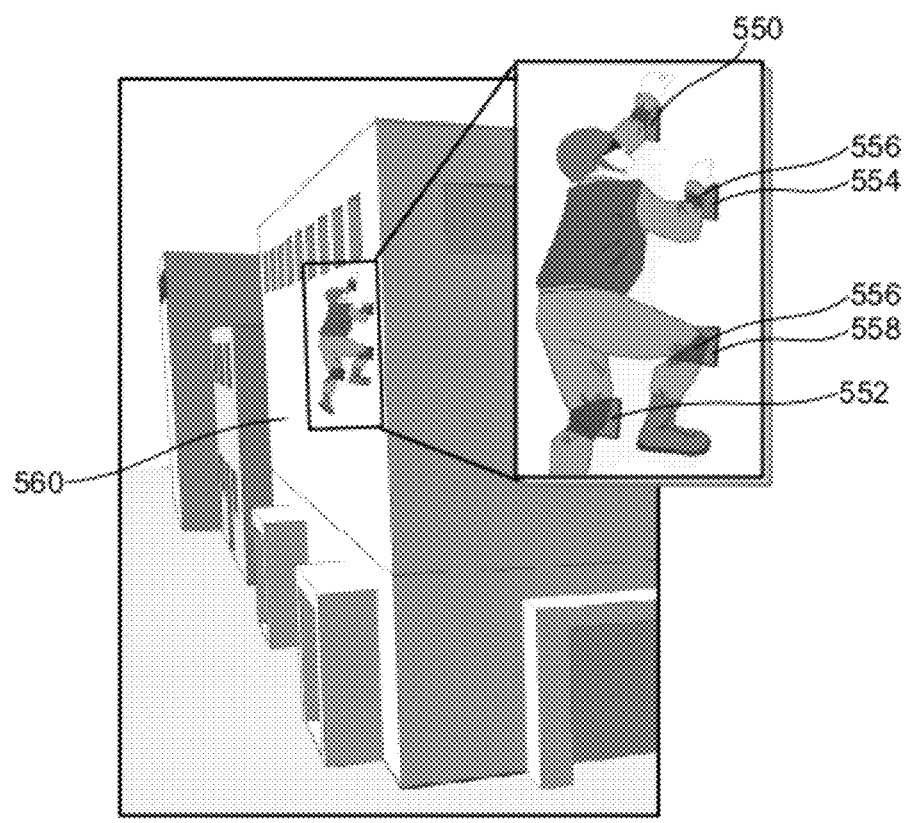
FIG. 14 shows electroadhesive handwear and electroadhesive leg-pads in accordance with a specific application embodiment.

Electroadhesion also enables other devices. FIG. 14 shows electroadhesive handwear 550 and electroadhesive leg-pads 552 in accordance with a specific application embodiment. Handwear 550 includes an electroadhesive device 554 and an interface 556 that attaches to electroadhesive device 554 and detachably couples to a hand or wrist of a person. Similarly, leg-pads 552 include an electroadhesive device 558 and an interface 556 that attaches to electroadhesive device 554 and detachably couples about a person's knee as shown.

Electroadhesive handwear 550 and leg-pads 552 allow the person to climb wall 560.

The size of electroadhesive devices 554 will vary with the adherence pressures provided by the electroadhesive devices 554. A conservative acceptable area may be 100 square inches of electroadhesive devices 554 using 4 pads (two handwear pads 550 and two leg pads 552). Assuming 3 psi clamping (sliding resistance) pressure, each 25 square inch pad (e.g. 5 inch×5 inch pads) would provide 75 lbs sliding resistance, so the pads could support up to 300 lbs. More or less electroadhesive area for handwear 550 and leg-pads 552 may be used.

While interface 556 includes a strap for both handwear 550 and leg-pads 552, other pad/person interfaces may be configured to detachably couple an electroadhesive device to a portion of a person. For example, handwear 550 may include a glove, mitten, etc., while leg-pads 552 may include shoes, boots or other leg or foot wear configured to detachably couple to a portion of a person's leg. In some cases, the electroadhesive electrodes may be patterned directly onto or worn as a covering over the fabric or clothing of the person.

Electroadhesion permits other devices and methods for a person to climb a wall. The methods may be described as 1) placing an electroadhesive device on a wall above a person, 2) adhering the electroadhesive device to the wall, and 3) ascending the wall using the coupling between the electroadhesive device and wall. Two examples of this method are shown in FIGS. 15A and 15B.

Figure 15A:
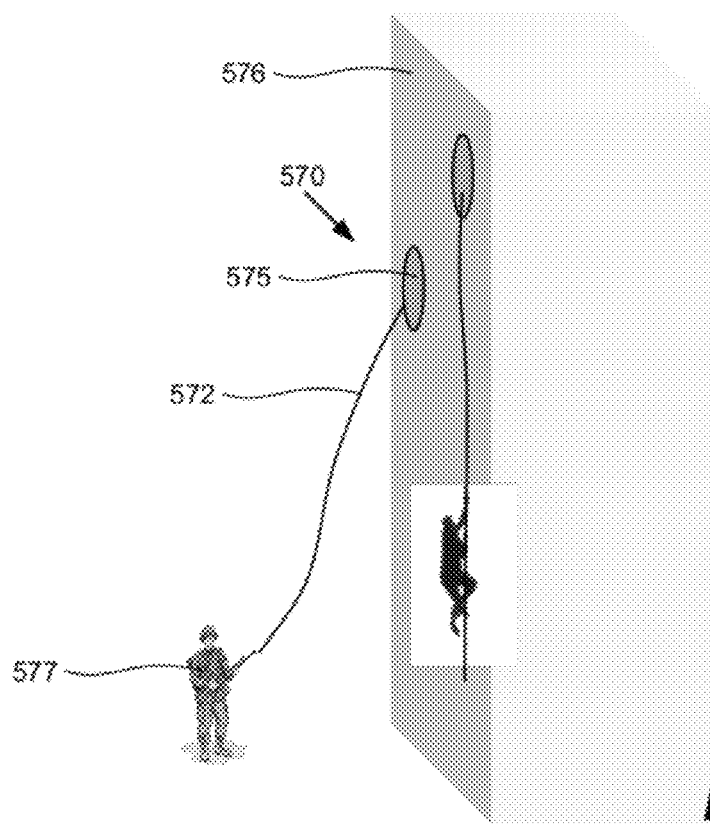
FIGS. 15A and 15B show electroadhesive scaling devices in accordance with two specific application embodiments.

FIG. 15A shows an electroadhesive scaling device 570 in accordance with a specific application embodiment. Device 570 includes a line 572 and electroadhesive device 575. An air pressure gun, or other projection device, propels electroadhesive device 575 up wall 576 and places device 575 on the wall above the person 577. Electroadhesive device 575 may include its own power supply, contact sensor and switch that initiates electroadhesion when device 575 hits the wall. Alternately the electronics are located with the person and line 572 includes suitable electrical connections to electroadhesive device 575. Electroadhesive device 575 may also include a compliant surface to dynamically improve adherence, as discussed above. In some cases, device 575 may also include mechanical grapplers, hooks etc. to provide additional adherence to the wall. After device 575 adheres to the wall, person 577 may then scale the wall using the coupling between the electroadhesive device 575 and wall. Line 572 may include rope, twine, or any other suitable lightweight cable.

Figure 15B:
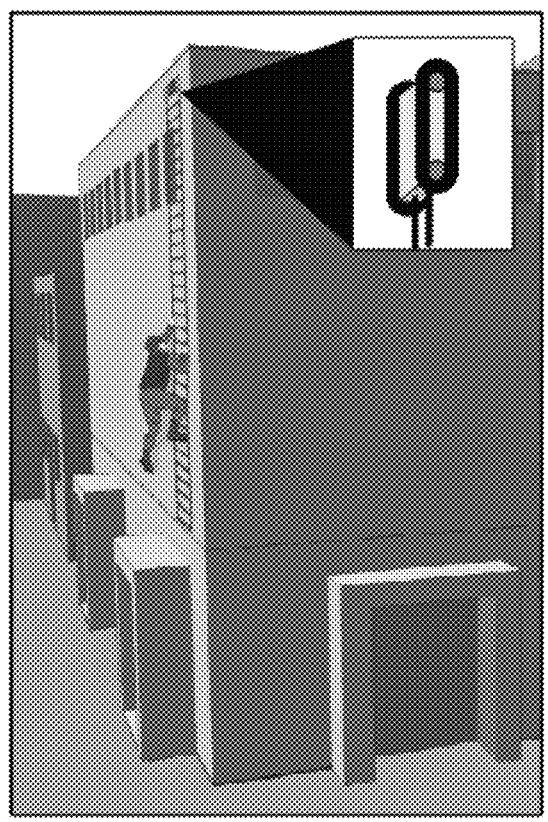

FIG. 15B shows an electroadhesive scaling device 580 in accordance with another specific application embodiment. In this case, device 590 includes a robot 350 and ladder 592 (or other line 572) attached to a trailing portion of robot 350. Person 577 places the electroadhesive devices on robot 350 on wall 576 by controlling movement of the robot 350. At a desired position, the robot stops and adheres to its current position, while the person 577 ascends ladder 592. In some cases, it is desirable to adhere ladder 592 along its length to the wall 576 to prevent large ladder motions. In such cases, the ladder 592 may be equipped with electroadhesion as well. With resting stops for the person along the wall or building, this process may be repeated as desired to scale large or high structures.

Another device enabled by electroadhesive devices described herein includes robotic grippers. The grippers have one or more electroadhesive devices that are well suited to grasp and pick up objects. These grippers find use in robotics such as manufacturing and industrial grippers where fragile items are to be handled without much force. Compliance or actuation in the gripper also permits the electroadhesive device(s) to globally shape to an object before electroadhesion is applied. The grippers are also well suited for picking up dust (an electroadhesive dust collector), leaves (and electroadhesive leaf remover), non-lethal insect traps (for experiments, for example) etc.

In another embodiment, an electroadhesive device is used in a device that is configured to provide controllable adhesion of one or more objects to a wall or other large structure. FIGS. 16A-16C show a detachable double-sided electroadhesive device 600 in accordance with another specific embodiment of the present invention.

Device 600 includes electrodes 602 and 604 disposed on opposite sides of an insulating material 606, as shown in FIG. 16B. More specifically, insulating material 606 includes a relatively flat profile and two opposing surfaces 603 and 601. Insulating material 606 may be rigid or flexible; in the latter case, device 600 assumes the stiffness of more rigid objects that it adheres to. One or more protective layers 615 may be disposed over the electrodes. Layers 615 are thin and may include an insulation material as described above such as mylar.

Electroadhesive device 600 is configured to controllably adhere to multiple objects simultaneously. This may include one or more objects on each surface 601 and 603. Together, adhering an object to each opposite surface 601 and 603 permits two separate objects to be temporarily coupled together using electroadhesion and device 600. FIG. 16A shows a cutaway of device 600 adhering to a wall 610 and adhering to picture frame 612. In other words, device mechanically couples frame 612 to wall 610, and may be used to hang frame 612 on the wall 610.

Device 600 may be thought of as a form of non-permanent adhesion that does not leave an aftereffect of the mechanical connection, in contrast to a hole left by a nail, for the objects it mechanically couples together. Post-it Notes and two-sided tape are examples of non-permanent adhesion, but obviously rely on chemical adhesives and are therefore susceptible to dust, particularly after repeated use. They may also require undesirable tradeoffs between the need to support a significant load and the need to be able to remove them without damage to the wall (for example pulling double-sided tape off a wall may also remove paint). Electroadhesion on the other hand can support larger structures and objects. Indeed, electroadhesive device 600 may be scaled in size from several square centimeters in surface area to several meters.

Sample objects that may be adhered to include: picture frames, calendars, staplers, cell phones, keys, posters, cords, decorations, banners, car dashboards, flat screen televisions and monitors, radios, lightweight shelves, wallpaper, and lights, for example. Wall 610 may alternatively include cabinets, the side of a desk, a home appliance, cars, billboards, etc. Electroadhesive device 600 allows a person to utilize typically untapped surfaces and spaces in an office or home, in a non-permanent and non-damaging manner.

While FIG. 16A shows device 600 adhering to one object on each side, device 600 may also adhere more than one object per side. For example, device 600 may be enlarged to resemble a cork-board on which objects are adhered using electroadhesion to the device 600, which itself adheres to a wall.

Switch 608 on side bar 611 is configured to allow a person to turn electroadhesive device on/off. Contact sensors are suitable for use, along with conventional mechanical switches. Embedded in control bar 611 is a battery or other power source such as solar panels and control circuitry, such as step-up voltage circuitry, as described above to power electroadhesive device 600. In many cases, the battery can be eliminated by use of a renewable source such as a small photovoltaic panel. The small amounts of power required can be generated from a solar panel operating indoors, similar to a solar cell calculator.

In another embodiment, device 600 is one-sided and has a permanent form of attachment on a surface opposite to the adhering surface. This may then be used to electrostatically adhere multiple objects to device 600, similar to a corkboard.

While this invention has been described in terms of several preferred embodiments, there are alterations, permutations, and equivalents that fall within the scope of this invention which have been omitted for brevity's sake. By way of example, although the present invention has been described in terms of several polymer materials and geometries, the present invention is not limited to these materials and geometries. It is therefore intended that the scope of the invention should be determined with reference to the appended claims.

What is claimed is:

1. An electroadhesive device, comprising:
    a first surface region adapted for contact with a first external object;
    a second surface region adapted for contact with a second external object, wherein the second surface region is separate from the first surface region, and the second external object is separate from the first external object; and
    at least one electrode located proximate to both of said first surface region and said second surface region, said at least one electrode being configured to apply at least one electrostatic adhesion voltage that produces at least one electrostatic force that is suitable to adhere both the first external object to the electroadhesive device and the second external object to the electroadhesive device when the at least one electrostatic adhesion voltage is applied.

2. The electroadhesive device of claim 1, wherein said at least one electrode comprises at least a pair of electrodes.

3. The electroadhesive device of claim 1, wherein at least a portion of said first surface region or said second surface region comprises a deformable surface region.

4. The electroadhesive device of claim 3, wherein said deformable surface region is adapted to move closer to a surface of an external object proximate the deformable surface region when the electrostatic adhesion voltage is applied.

5. The electroadhesive device of claim 3, wherein said deformable surface region includes a material or structure that is bendable but not substantially elastically extendable.

6. The electroadhesive device of claim 1, wherein at least a portion of said first surface region or said second surface region includes a compliant surface adapted to conform to surface features of an external object proximate the compliant surface when the electrostatic adhesion voltage is applied.

7. The electroadhesive device of claim 1, further comprising a controller configured to cause the at least one electroadhesive attraction voltage to be applied to the at least one electrode.

8. The electroadhesive device of claim 7,
wherein the at least one electrode includes a first pair of electrodes proximate the first surface region and a second pair of electrodes proximate the second surface region, and
wherein the controller is configured to separately cause voltage to be applied to the first pair of electrodes and the second pair of electrodes.

9. The electroadhesive device of claim 8, wherein the controller is further configured to: (i) receive an indication of a user input and (ii) cause voltage to be applied to the first pair of electrodes and the second pair of electrodes based on the received indication of the user input such that the electroadhesive device controllably adheres to the first and second external objects.

10. The electroadhesive device of claim 9, further comprising a switch configured to convey the user input to the controller.

11. The electroadhesive device of claim 7, further comprising at least one contact sensor configured to indicate that at least a portion of the first surface region or the second surface region is in contact with an external object, and
wherein the controller is further configured to (i) receive an indication from the contact sensor and (ii) cause voltage to be applied to the at least one electrode such that the portion adheres to the external object in response to receiving the indication.

12. The electroadhesive device of claim 7, further comprising at least one of a photovoltaic panel or a battery electrically connected to the at least one electrode and configured to power the electroadhesive device.

13. The electroadhesive device of claim 1, wherein the first and second surface regions face substantially different directions.

14. The electroadhesive device of claim 1, further comprising an insulating material interposed between separately controllable ones of the at least one electrode.

15. The electroadhesive device of claim 14, wherein the insulating material is shaped as a plate with substantially flat opposing sides and the first and second surface regions are situated on the opposing sides.

16. An electroadhesive device comprising:
an insulating material having a first side and a second side opposing the first side;
a first pair of electrodes disposed on the first side of the insulating material;
a second pair of electrodes disposed on the second side of the insulating material; and
a controller configured to: (i) apply voltage to the first pair of electrodes so as to electrostatically adhere to a first external object proximate the first side of the insulating material, (ii) apply voltage to the second pair of electrodes so as to electrostatically adhere to a second external object proximate the second side of the insulating material, and wherein the controller is configured to separately apply voltage to the first pair of electrodes and the second pair of electrodes.

17. The electroadhesive device of claim 16, wherein at least a portion of the first pair of electrodes or the second pair of electrodes are included in a compliant surface adapted to conform to surface features of an external object proximate the compliant surface when an electrostatic adhesion voltage is applied to the portion of the first pair of electrodes or the second pair of electrodes.

18. A method comprising:
receiving, at a controller of an electroadhesive device, a first indication to activate adhesion in a first surface of the electroadhesive device;
responsive to receiving the first indication, applying voltage to a first pair of electrodes disposed on the first surface;
receiving a second indication to activate adhesion in a second surface of the electroadhesive device; and
responsive to receiving the second indication, applying voltage to a second pair of electrodes disposed on the second surface;
wherein the first surface and the second surface are disposed on opposing sides of an insulating material interposed between the first pair of electrodes and the second pair of electrodes, and
wherein at least a portion of the first surface or the second surface includes a compliant surface adapted to conform to surface features of an external object proximate the compliant surface when the electrostatic adhesion voltage is applied.

19. The method of claim 18, wherein at least one of the first indication or the second indication is received via a contact sensor configured to detect that at least a portion of the first surface or the second surface is in contact with an external object.

20. The method of claim 18, wherein at least one of the first indication or the second indication is received via a user input.

* * * * *